US012664995B2

(12) United States Patent
Fujioka et al.

(10) Patent No.: US 12,664,995 B2
(45) Date of Patent: Jun. 23, 2026

(54) SIGNAL PROCESSING DEVICE AND SIGNAL PROCESSING METHOD

(71) Applicant: SONY GROUP CORPORATION, Tokyo (JP)

(72) Inventors: Takashi Fujioka, Tokyo (JP); Takeshi Matsui, Tokyo (JP); Tomoharu Kasahara, Tokyo (JP); Keiichi Osako, Tokyo (JP); Takao Fukui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 102 days.

(21) Appl. No.: 18/551,228

(22) PCT Filed: Jan. 19, 2022

(86) PCT No.: PCT/JP2022/001707

§ 371 (c)(1),
(2) Date: Sep. 19, 2023

(87) PCT Pub. No.: WO2022/209171

PCT Pub. Date: Oct. 6, 2022

(65) Prior Publication Data

US 2024/0170000 A1 May 23, 2024

(30) Foreign Application Priority Data

Mar. 31, 2021 (JP) ................................ 2021-062342

(51) Int. Cl.
*G10L 21/0216* (2013.01)
*G10L 21/0208* (2013.01)
(Continued)

(52) U.S. Cl.
CPC .......... *G10L 21/0216* (2013.01); *G10L 25/30* (2013.01); *H04R 29/001* (2013.01); *G10L 2021/02082* (2013.01)

(58) Field of Classification Search
CPC ................. G10L 21/0216; G10L 25/30; G10L 2021/02082; H04R 29/001; H04R 2499/11; H04S 7/305
(Continued)

(56) References Cited

U.S. PATENT DOCUMENTS

| | | | | |
|---|---|---|---|---|
| 5,544,249 | A * | 8/1996 | Opitz | H04S 7/305 381/63 |
| 10,701,481 | B2 * | 6/2020 | Townsend | H04R 1/222 |
| 2011/0222372 | A1 * | 9/2011 | O'Donovan | G01S 3/8083 367/103 |

FOREIGN PATENT DOCUMENTS

| | | | |
|---|---|---|---|
| JP | 05-066795 | A | 3/1993 |
| JP | 2009-276365 | A | 11/2009 |

(Continued)

OTHER PUBLICATIONS

International Search Report and Written Opinion of PCT Application No. PCT/JP2022/001707, issued on Apr. 26, 2022, 09 pages of ISRWO.

*Primary Examiner* — Paul Kim
(74) *Attorney, Agent, or Firm* — CHIP LAW GROUP

(57) ABSTRACT

To satisfactorily perform processing of increasing the sound quality of a recorded sound source obtained by picking up vocal sound and musical instrument sound in a room. An output audio signal is obtained by a sound converter performing sound conversion processing on a recorded sound source (an input audio signal) obtained by picking up vocal sound or musical instrument sound by using any microphone in any room. The sound conversion processing includes processing of removing room reverberation from the recorded sound source, processing of remove picked-up sound noise from the recorded sound source, processing of including target microphone characteristics into the recorded
(Continued)

sound source, and processing of including the target studio characteristics into the recorded sound source.

19 Claims, 26 Drawing Sheets

(51) Int. Cl.
*G10L 25/30* (2013.01)
*H04R 29/00* (2006.01)
(58) Field of Classification Search
USPC .......................................................... 381/66
See application file for complete search history.

(56) References Cited

FOREIGN PATENT DOCUMENTS

| | | | |
|---|---|---|---|
| JP | 2009-545914 | A | 12/2009 |
| WO | 2018/211988 | A1 | 11/2018 |

* cited by examiner

SIGNAL PROCESSING DEVICE AND SIGNAL PROCESSING METHOD

CROSS REFERENCE TO RELATED APPLICATIONS

This application is a U.S. National Phase of International Patent Application No. PCT/JP2022/001707 filed on Jan. 19, 2022, which claims priority benefit of Japanese Patent Application No. JP 2021-062342 filed in the Japan Patent Office on Mar. 31, 2021. Each of the above-referenced applications is hereby incorporated herein by reference in its entirety.

TECHNICAL FIELD

The present technology relates to a signal processing device, a signal processing method, and a program, and more specifically to a signal processing device and others that process an audio signal (recorded sound source) obtained by picking up vocal sound and musical instrument sound by using a built-in microphone of a smartphone in any room, for example.

BACKGROUND ART

Smartphones include filters designed to obtain sound output results expected in response to sound input under certain usage conditions and environments. Such a filter is effective against known and predictable periodic and linear noise, so that it is widely used in smartphone voice processing, such as background noise reduction during voice calling and background noise reduction during voice recording.

For vocal and musical instrument sound recording for music production at home or outdoors with a smartphone, soundproofing measures are necessary to prevent ambient noise from being mixed and sound absorption measures are necessary to reduce the effects of reverberation. In vocal recording for music production, it is necessary to monitor the vocal and instrumental (accompaniment) sounds being recorded from a microphone in real time with the singer's headphones in order for the singer to sing on the correct pitch and rhythm.

For example, PTL 1 describes a technology in which measured sound is output from at least one of a plurality of speaker units installed in different directions, and the gain of the speaker unit is controlled based on the reverberation characteristics when the measured sound is measured with a microphone at any position, thereby suppressing the excess reverberation.

CITATION LIST

Patent Literature

[PTL 1]
WO 2018/211988

SUMMARY

Technical Problem

The filters mentioned above can reduce predictable periodic noise and linear noise, but at the same time, they also impair the sound quality of signals (sound sources) that should not be removed as fundamentals, failing to ensure the sound quality required for recording vocals and instruments for music production. In addition, such a filter cannot reduce unpredictable noise, so that it is difficult to remove non-stationary noise that occurs suddenly (such as sirens) and room reverberation that fluctuates depending on the shape and size of the room and the material of the wallpaper.

For monitoring vocal recording, it is important to have a mechanism that provides a sense of immersion in songs by using equalizers and filters such as reverb so as to allow for listening to the sound from a microphone without delay and to obtain the characteristics close to those of sound data that is actually to be picked up and edited. However, for low-latency monitoring, general smartphones do not have a mechanism that implements any filter in software, so that it is difficult to achieve both low-latency and sound quality adjustment as expected.

Vocal and music recording for music production is typically performed using microphones dedicated to recording in a recording studio that is less susceptible to non-stationary noise, resonance, and reverberation. However, due to the COVID-19 pandemic, studios have been forced to close and operating rates have declined, and accordingly, there has been an issue for mastering and music production in that recording with the same sound quality as in studios can be made in a place instead of recording studios, for example, at home. Therefore, it becomes necessary to reduce the effects of non-stationary noise and reverberation.

An object of the present technology is to satisfactorily perform processing of increasing the sound quality of a recorded sound source obtained by picking up vocal sound and musical instrument sound in a room, such as processing of removing picked-up sound noise and room reverberation and processing of adding target microphone characteristics and target studio characteristics.

Solution to Problem

According to an aspect of the present technology, a signal processing device includes:

a sound converter that performs sound conversion processing on an input audio signal obtained by picking up vocal sound or musical instrument sound by using any microphone in any room to obtain an output audio signal, wherein the sound conversion processing includes processing of removing room reverberation from the input audio signal.

In the present technology, an output audio signal is obtained by the sound converter performing sound conversion processing on an input audio signal obtained by picking up vocal sound or musical instrument sound by using any microphone in any room. The sound conversion processing includes processing of removing room reverberation from the input audio signal.

For example, the processing of removing room reverberation may be performed using a deep neural network trained to remove room reverberation. This use of a deep neural network to remove room reverberation is to estimate and output only the direct sound, not to perform an inverse operation of adding reverberation, and makes it possible to avoid the divergence of solution and thus to perform the removal of room reverberation satisfactory. In this case, depending on an equipment installation method for reverberation measurement (a reference speaker being fixed at the front, and a microphone (smartphone) being oriented in various directions), it is possible to eliminate the influence of the directional characteristics (polar pattern) of the speaker, while achieving the robustness of how the vocalist holds the microphone.

In this case, for example, the deep neural network may be trained in such a manner that uses as a deep neural network input an audio signal with room reverberation obtained by convolving a dry input with a room reverberation impulse response generated by causing the reference speaker to output sound in the room based on a TSP signal and then picking up the sound with any microphone, and feeds back a difference displacement of a deep neural network output in response to the dry input to parameters. In this case, the reference speaker outputs sound based on the TSP signal and any microphone picks up the sound to generate the room reverberation impulse response, and if the input audio signal includes the characteristics of the microphone, it is possible to train the deep neural network so that the characteristics can be canceled.

In the present technology as such, sound conversion processing, including processing of removing room reverberation from an input audio signal, is performed on the input audio signal (recorded sound source) obtained by picking up vocal sound or musical instrument sound by using any microphone in any room, so that the room reverberation can be removed satisfactorily.

In the present technology, for example, the sound conversion processing may further include processing of removing picked-up sound noise from the input audio signal. Thus, the picked-up sound noise can be removed satisfactorily.

For example, the processing of removing picked up sound noise may be performed using a deep neural network trained to remove picked-up sound noise. In this case, since the picked-up sound noise is not removed by a filter, the sound quality of the audio signal is not impaired, and non-stationary noise that occurs suddenly in addition to periodic noise and linear noise can also be removed satisfactorily.

In this case, for example, the deep neural network may be trained in such a manner that uses as a deep neural network input an audio signal obtained by adding noise picked up with any microphone to a dry input, and feeds back a difference displacement of a deep neural network output in response to the dry input to parameters.

In this case, for example, the deep neural network may be trained in such a manner that uses as a deep neural network input an audio signal obtained by adding picked-up sound noise picked up with any microphone to an audio signal with room reverberation obtained by convolving a dry input with a room reverberation impulse response generated by causing the reference speaker to output sound in the room based on a TSP signal and then picking up the sound with the microphone, and feeds back a difference displacement of a deep neural network output in response to the audio signal with room reverberation to parameters. This training using the audio signal with room reverberation makes it possible to expect to have a greater effect of noise reduction in a sound pickup environment with high reverberation, and also to expand the number of training data by generating and using a plurality of reverberation patterns for the training for the same dry input.

For example, simultaneously with the processing of removing room reverberation, the processing of removing picked-up sound noise may be performed using a deep neural network trained to remove room reverberation and picked-up sound noise. In this case, for example, the deep neural network may be trained in such a manner that uses as a deep neural network input an audio signal obtained by adding picked-up sound noise picked up with any microphone to an audio signal with room reverberation obtained by convolving a dry input with a room reverberation impulse response generated by causing the reference speaker to output sound in the room based on a TSP signal and then picking up the sound with the microphone, and feeds back a difference displacement of a deep neural network output in response to the dry input to parameters. With such a configuration to remove room reverberation and picked-up noise using the same deep neural network, the amount of processing in a cloud can be reduced, for example.

In the present technology, for example, the sound conversion processing may further include processing of including characteristics of the target microphone (target microphone characteristics) into the input audio signal. This makes it possible to include the characteristics of the target microphone into the input audio signal satisfactory.

For example, the processing of including the characteristics of the target microphone may be performed by convolving the input audio signal with an impulse response for the characteristics of the target microphone. With such a configuration, it is possible to include the linear characteristics of the target microphone into the input audio signal.

In this case, for example, the impulse response for the characteristics of the target microphone may be generated by causing the reference speaker to output sound based on a TSP signal and then picking up the sound with the target microphone. When the input audio signal includes the reverse characteristics of the reference speaker, this pickup of sound using the target microphone makes it possible to cancel the reverse characteristics of the reference speaker.

For example, the processing of including the characteristics of the target microphone may be performed by convolving the input audio signal with the impulse response for the characteristics of the target microphone and then using a deep neural network trained to include the non-linear characteristics of the target microphone. With such a configuration, it is possible to include both the linear and non-linear characteristics of the target microphone into the input audio signal.

In this case, for example, the impulse response for the characteristics of the target microphone may be generated by causing the reference speaker to output sound based on a TSP signal and then picking up the sound with the target microphone, and the deep neural network may be trained in such a manner that uses as a deep neural network input an audio signal obtained by convolving with the impulse response for the characteristics of the target microphone, and feeds back to parameters a difference displacement of a deep neural network output in response to the audio signal obtained by causing the reference speaker to output sound based on a dry input and then picking up the sound with the target microphone. When the input audio signal includes the reverse characteristics of the reference speaker, this pickup of sound using the target microphone makes it possible to cancel the reverse characteristics of the reference speaker.

For example, the processing of including the characteristics of the target microphone may be performed using a deep neural network trained to include both the linear and non-linear characteristics of the target microphone into the input audio signal. With such a configuration, both the linear and non-linear characteristics of the target microphone can be included into the input audio signal, and the configuration can be simpler than the case where linear conversion processing and non-linear conversion processing are separated.

In this case, for example, the deep neural network may be trained in such a manner that uses a dry input as a deep neural network input, and feeds back to parameters a difference displacement of a deep neural network output in response to the audio signal obtained by causing the reference speaker to output sound based on the dry input and then picking up the sound with the target microphone. When the input audio signal includes the reverse characteristics of the reference speaker, this pickup of sound using the target microphone makes it possible to cancel the reverse characteristics of the reference speaker.

In the present technology, for example, the sound conversion processing may further include processing of including characteristics of a target studio into the input audio signal. For example, the processing of including the characteristics of the target studio may be performed by convolving the input audio signal with an impulse response for the characteristics of the target studio. With such a configuration, the characteristics of the target studio can be included into the input audio signal.

According to another aspect of the present technology, an information processing method includes:

a step of performing sound conversion processing on an input audio signal obtained by picking up vocal sound or musical instrument sound by using any microphone in any room to obtain an output audio signal, wherein the sound conversion processing includes processing of removing room reverberation from the input audio signal.

According to still another aspect of the present technology, a program causing a computer to function as:

a sound converter that performs sound conversion processing on an input audio signal obtained by picking up vocal sound or musical instrument sound by using any microphone in any room to obtain an output audio signal, wherein the sound conversion processing includes processing of removing room reverberation from the input audio signal.

DESCRIPTION OF EMBODIMENTS

Modes for carrying out the present invention (hereinafter referred to as "embodiments") will be described below. The descriptions will be given in the following order.

1. Embodiment
2. Modification Example

1. Embodiment

Figure 1:
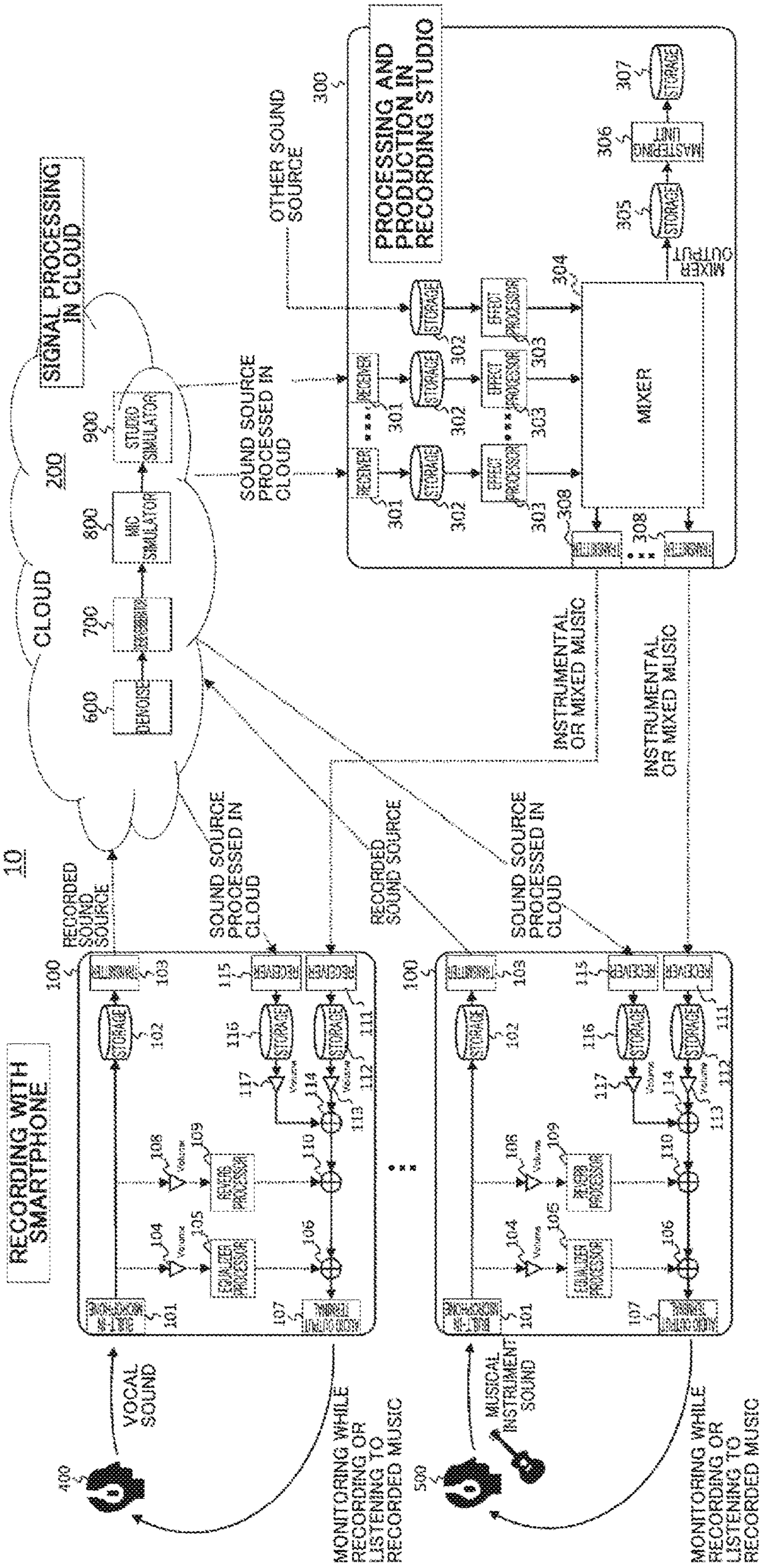
FIG. 1 is a diagram illustrating a configuration example of a recording processing system for vocal and instrument for music production using smartphones.

FIG. 1 illustrates a configuration example of a recording processing system 10 for vocal and instrument for music production using smartphones.

This recording processing system 10 includes a plurality of smartphones 100, a signal processing device 200 in a cloud, and a processing and production device 300 in a recording studio.

The smartphone 100 that records vocal sound records vocal sound generated by a vocalist 400 singing, and transmits the recorded sound source to the signal processing device 200 in the cloud. This recording is performed in any room, such as a room of the house of the vocalist 400.

During recording, vocal sound is picked up by a built-in microphone 101, and an audio signal of the vocal sound obtained by the built-in microphone 101 is accumulated in a storage 102 as the recorded sound source of the vocal sound. The recorded sound source of the vocal sound accumulated in the storage 102 in this way is transmitted by a transmitter 103 to the signal processing device 200 in the cloud at an appropriate timing.

During recording, the audio signal of the vocal sound obtained by the built-in microphone 101 is output to an audio output terminal 107 via a volume 104, an equalizer processor 105, and an adder 106. The equalizer processing is processing of adjusting high-pitched, middle-pitched, and low-pitched sounds, making them easier to listen to, and emphasizing them. The vocalist 400 can monitor the vocal sound on which the equalizer processing has been performed, using headphones based on the audio signal of the vocal sound output to the audio output terminal 107.

During recording, the audio signal of the vocal sound obtained by the built-in microphone 101 is output to the audio output terminal 107 via a volume 108, a reverb processor 109, an adder 110, and the adder 106. In this case, the audio signal of the vocal sound output to the audio output terminal 107 is added with a reverberation component generated by the reverb processor 109.

Thus, the vocal sound monitored by the vocalist 400 using the headphones is subjected to the equalizer processing and added with a reverberation component. Therefore, the vocalist 400 can comfortably listen to the vocalist's own vocal sound and sing in a state where it is easy to sing.

In the smartphone 100, a receiver 111 receives an audio signal of instrumental sound, that is, accompaniment sound from the processing and production device 300 in the recording studio in advance and accumulates the audio signal in a storage 112. During recording, this audio signal of the accompaniment sound is read from the storage 112 and output to the audio output terminal 107 via a volume 113, an adder 114, the adder 110, and the adder 106. This allows the vocalist 400 to listen to the accompaniment sound using the headphones and sing to the accompaniment sound.

Figures 2A, 2B, 2C:
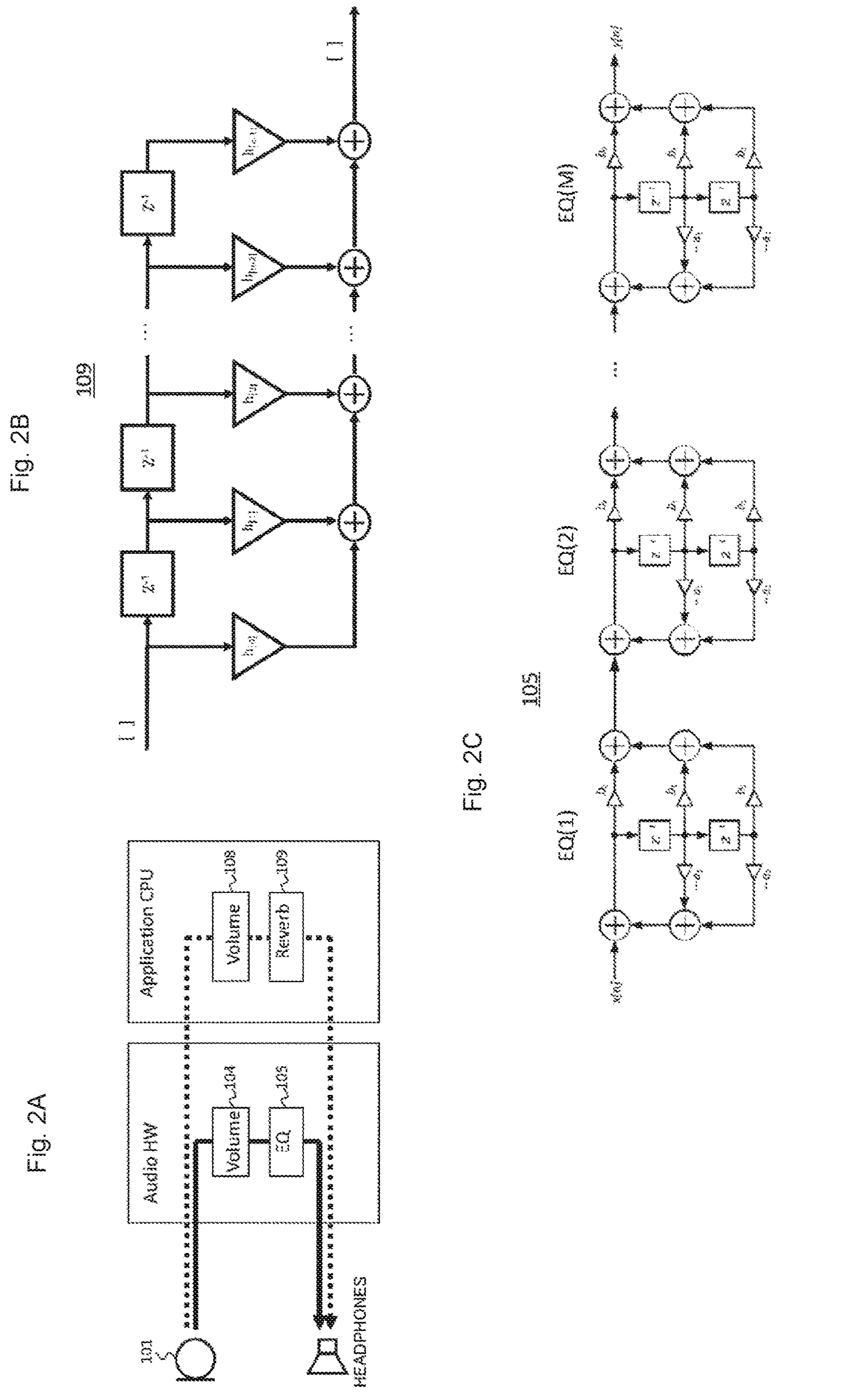
FIGS. 2A, 2B, and 2C are diagrams illustrating an audio signal processor for vocal sound for monitoring in the smartphone.

FIG. 2 A illustrates a signal processor for vocal sound for monitoring in a smartphone 100*a*. The audio signal of the vocal sound obtained by the built-in microphone 101 is supplied to the headphones via the volume 104 and the equalizer processor 105, which are composed of hardware (Audio HW). FIG. 2 C illustrates a typical configuration example of the equalizer processor 105. In this configuration example, the equalizer processor 105 is composed of an infinite impulse response (IIR) filter. Thus, the audio signal of the vocal sound obtained by the built-in microphone 101 is fed back with low delay only through the filter that can be processed by hardware. This realizes low-latency monitoring of vocal sounds.

The volume 108 and the reverb processor 109 are composed of software (Application CPU), and generate a reverberation component based on the vocal sound obtained by the built-in microphone 101. This reverberation component is then supplied to the headphones. FIG. 2 B illustrates a typical configuration example of the reverb processor 109. In this configuration example, the reverb processor 109 is composed of a finite impulse response (FIR) filter.

Thus, the reverberation component is generated by software filtering and fed back. Therefore, reverb processing can be performed that is processing with flexibility. For example, changing the filter coefficients makes it possible to easily achieve various types of reverberation effects, providing high customizability. In addition, since the reverb processing is not performed by hardware processing, a rich hardware configuration with a high-performance CPU and abundant memory is not required, and it is easy to add a reverb processing function to the smartphone 100. Since the reverb processing is performed by software processing, the delay in the generated reverberation component is greater than in hardware processing. However, this reverberation component gives a sense of spread of the sound but no sense of incongruity in listening.

Returning to FIG. 1, the signal processing device 200 in the cloud is composed of, for example, a computer (server) in the cloud, and performs high-quality signal processing. This signal processing device 200 includes a denoise 600, a dereverberator 700, a mic simulator 800, and a studio simulator 900. Details of this signal processing device 200 will be described later.

The signal processing device 200 in the cloud performs, on the recorded sound source of the vocal sound (audio signal of the vocal sound) transmitted from the smartphone 100, processing of removing picked-up sound noise, processing of removing room reverberation, processing of including the characteristics of the target microphone, and processing of including the characteristics of the target studio, to obtain a sound source processed in the cloud (sound source on which high-quality sound processing has been performed).

In the smartphone 100, the sound source processed in the cloud is received by a receiver 115 and accumulated in a storage 116 in response to an operation by the vocalist 400, for example. After that, this sound source is read from the storage 116 and output to the audio output terminal 107 via a volume 117, the adder 114, the adder 110, and the adder 106. This allows the vocalist 400 to listen to the sound source processed in the cloud by using the headphones.

The smartphone 100 that records musical instrument sound records musical instrument sound generated by a musician 500 playing a musical instrument, and transmits the recorded sound source to the signal processing device 200 in the cloud. This recording is performed in any room, such as a room of the house of the musician 500. The smartphone 100 that records this musical instrument sound has the same configuration and functions as the smartphone 100 that records vocal sound described above, but detailed description thereof is omitted here.

The processing and production device 300 in the recording studio performs effect processing on each of the sound sources of the vocal sound and musical instrument sound which have been processed in the cloud, and other sound sources, and further mixes the sound sources on which the effect processing has been performed to obtain mixed music.

In this case, the sound sources of vocal sound and musical instrument sound processed in the cloud are received by receivers 301 and accumulated in storages 302. The other sound sources are also accumulated in a storage 302. The sound sources accumulated in the storages 302 are subjected to effect processing such as trim, compressor, equalizer, and reverb, surround by effect processors 303, and then mixed by a mixer 304 to obtain mixed music.

The mixed music thus obtained by the mixer 304 are accumulated in a storage 305. In addition, the mixed music is subjected to adjustments such as compression and equalization by a mastering unit 306 to generate the final music to be accumulated in a storage 307.

The mixed music obtained by the mixer 304 is transmitted to the smartphone 100 by the transmitter 308. In the smartphone 100, the mixed music transmitted from the processing and production device 300 in the recording studio is received by the receiver 111 and accumulated in the storage 112. After that, the mixed music is read from the storage 112 and output to the audio output terminal 107 via the volume 113, the adder 114, the adder 110, and the adder 106. As a result, the vocalist 400 and the musician 500 can listen to the mixed music using headphones.

Figure 3:
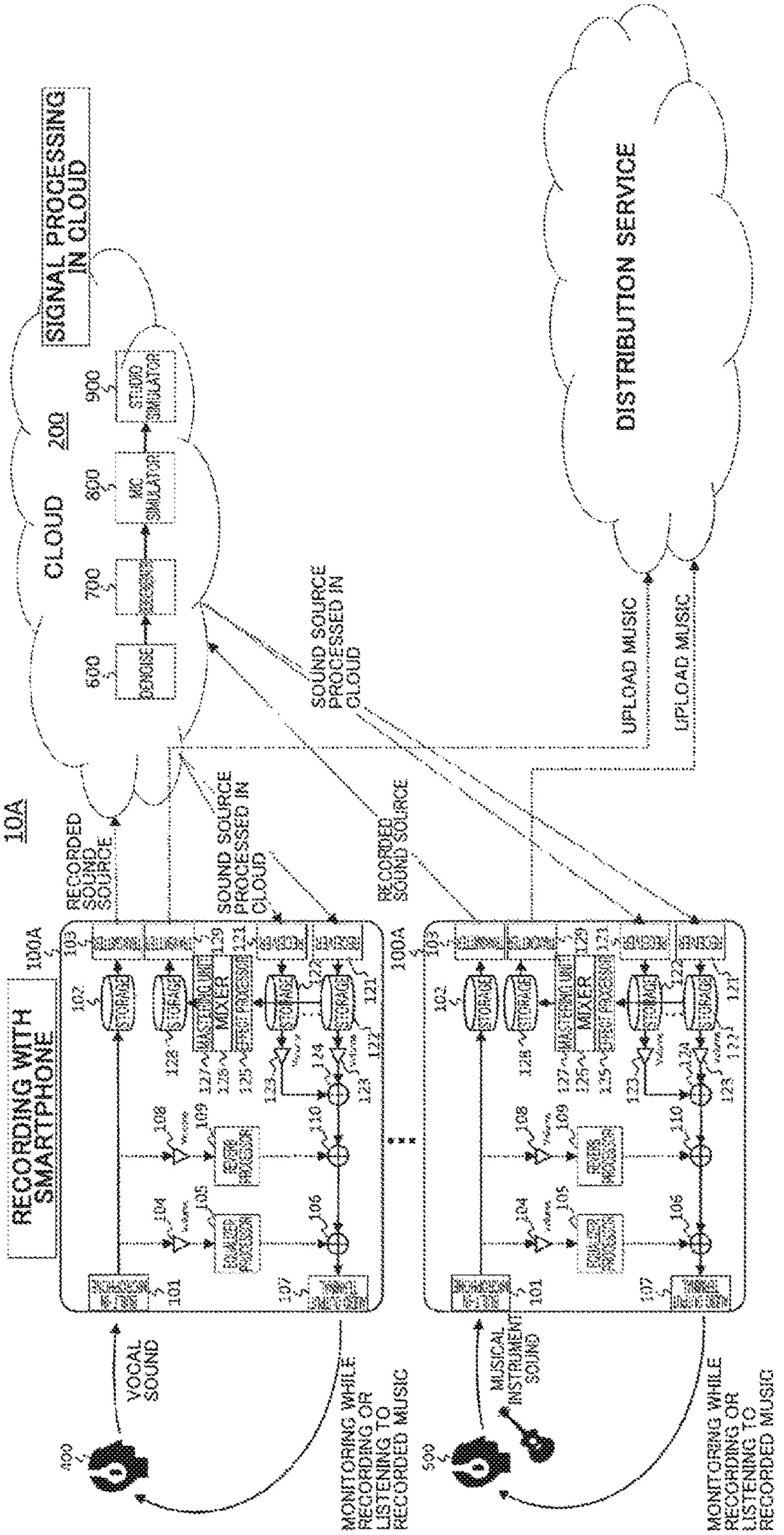
FIG. 3 is a diagram illustrating a configuration example of another vocal/instrument recording processing system for music production using smartphones.

FIG. 3 illustrates a configuration example of a recording processing system 10A for vocal and instrument for music production using smartphones. In FIG. 3, the parts corresponding to those in FIG. 1 are designated by the same reference numerals, and detailed description thereof will be omitted as appropriate.

This recording processing system 10A includes a plurality of smartphones 100A and a signal processing device 200 in a cloud. The smartphone 100A has the same functions as the processing and production device 300 in the recording studio illustrated in FIG. 1 in addition to the functions of the smartphone 100 illustrated in FIG. 1.

In the smartphone 100A, a plurality of sound sources (of the vocal sounds and musical instrument sounds) processed in the cloud are received by receivers 121 and accumulated in storages 122. The plurality of sound sources are selectively read from the storages 122 in response to an operation by the user (the vocalist 400 or the musician 500), and output to the audio output terminal 107 via volumes 123, adders 124, the adder 110, and the adder 106. This allows the user to listen to each sound source processed in the cloud using headphones.

In the smartphone 100A, a plurality of sound sources (of the vocal sounds and musical instrument sounds) processed in the cloud are read from the storages 122 in response to an operation by the user (the vocalist 400 or the musician 500), each sound source is subjected to effect processing such as trim, compressor, equalizer, reverb, and surround by an effect processor 125, the resulting sound sources are then mixed by a mixer 126 to obtain mixed music, and the mixed music is further subjected to adjustments such as compression and equalization by a mastering unit 127 to generate the final music to be accumulated in a storage 128.

The music accumulated in the storage 128 is read from the storage 128 in response to an operation by the user (the vocalist 400 or the musician 500), uploaded to a distribution service by a transmitter 129, and distributed to end users of the distribution service as appropriate.

Figure 4:
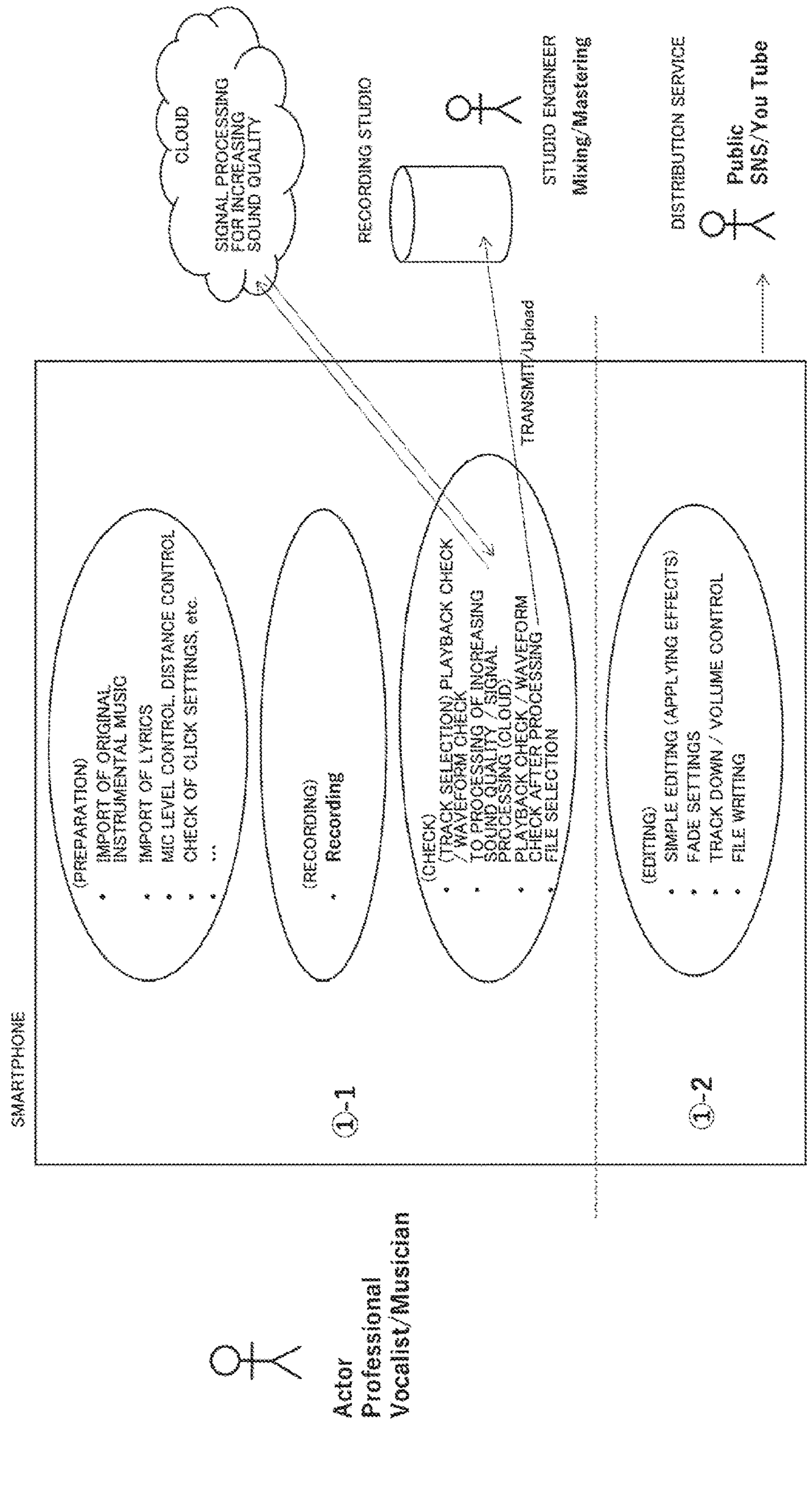
FIG. 4 is a diagram conceptually illustrating use case modeling.

FIG. 4 conceptually illustrates use case modeling, that is, what kind of processing the smartphones 100 and 100A perform from a user's point of view.

First, the smartphone 100 illustrated in FIG. 1 will be described. This smartphone 100 sequentially performs processing for a preparation phase, a recording phase, and a check phase, indicated by circle 1-1 in FIG. 4. The preparation phase includes import of original instrumental sound, import of lyrics, microphone level control, distance control, and check of click settings, etc. The recording phase includes recording. The check phase includes playback check and waveform check of the recorded sound source, supply of the recorded sound source to processing of increasing the image quality of and signal processing of the recorded sound source, playback check and waveform check of the sound source processed, and file selection.

In the description of the recording processing system 10 illustrated in FIG. 1, the sound source processed in the cloud is transmitted directly from the cloud to the recording studio. However, the sound source processed in the cloud may be transmitted to the recording studio via the smartphone 100 as illustrated in FIG. 4. This allows the smartphone 100 to download the sound source processed in the cloud from the cloud, check the playback of the sound source, and then upload it as the sound source to be used in the recording studio.

Next, the smartphone 100A illustrated in FIG. 3 will be described. This smartphone 100A sequentially performs the processing of the preparation phase, the recording phase, and the check phase, indicated by circle 1-1 in FIG. 4, and then performs processing of editing phase indicated by circle 1-2 in FIG. 4. The recording phase includes simple editing (applying effects), fade settings, track down and volume adjustment, and file writing.

Signal Processing Device in Cloud

Next, the signal processing device 200 in the cloud will be described. This signal processing device 200 performs sound conversion processing on an input audio signal (recorded sound source) to obtain an output audio signal. This sound conversion processing includes denoising (denoise), dereverberation (dereverberator), mic simulation (mic simulator), studio simulation (studio simulator), and the like.

The denoising is processing of removing picked-up sound noise from the input audio signal (recorded sound source). The dereverberation is processing of removing room reverberation from the input audio signal (recorded sound source). The mic simulation is processing of including the characteristics of the target microphone into the input audio signal (recorded sound source). The studio simulation is processing of including the characteristics of the target studio into the input audio signal (recorded sound source).

Figure 5:
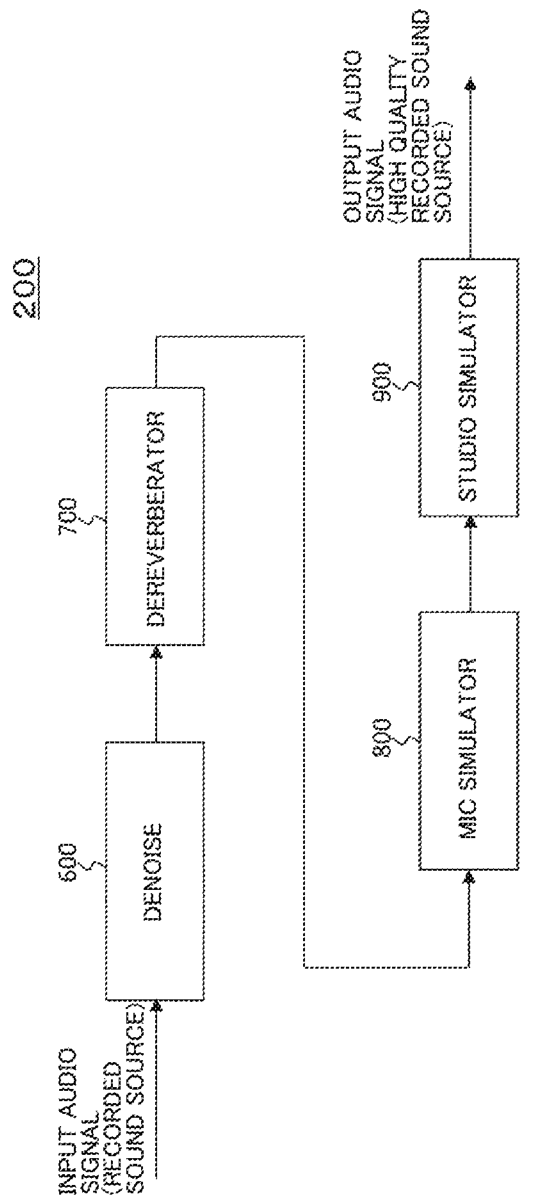
FIG. 5 is a diagram illustrating a configuration example of a signal processing device in a cloud.

FIG. 5 illustrates a configuration example of the signal processing device 200. This signal processing device 200 includes the denoise 600, the dereverberator 700, the mic simulator 800, and the studio simulator 900. Each of these processors constitutes a sound converter.

Figure 6:
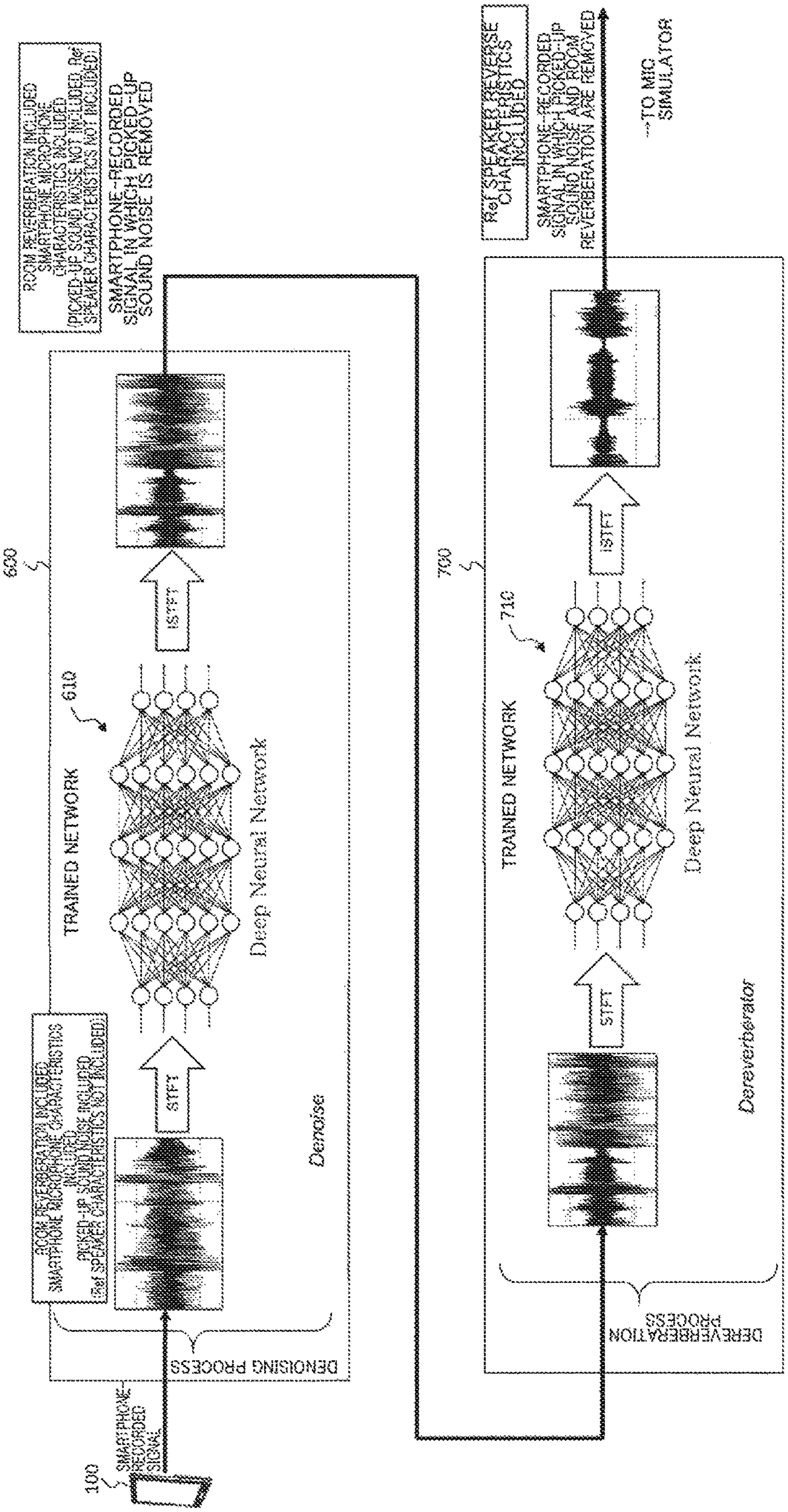
FIG. 6 is a diagram illustrating a configuration example of a denoise and a dereverberator.

FIG. 6 illustrates a configuration example of the denoise 600 and the dereverberator 700. The denoise 600 uses a deep neural network (deep neural network, DNN) 610 trained to remove picked up sound noise to remove picked-up sound noise from a smartphone-recorded signal serving as the input audio signal (recorded sound source). This input audio signal includes room reverberation corresponding to the room in which sound is picked up, includes the characteristics of the built-in microphone 101 of the smartphone 100, and includes picked-up sound noise that is noise that is mixed during sound pickup.

The input audio signal is transformed by the short-time Fourier transform (STFT), and the resulting signal is used as an input of the deep neural network 610. Then, the output of the deep neural network 610 is transformed by the inverse short-time Fourier transform (ISTFT), and the resulting signal is used as a smartphone-recorded signal, serving as the output signal of the denoise 600, in which the picked-up sound noise is removed. The smartphone-recorded signal in which the picked up sound noise is removed includes room reverberation corresponding to the room in which sound is picked up, and includes the characteristics of the built-in microphone of the smartphone 100.

As described above, the denoise 600 illustrated in FIG. 6 can satisfactorily remove the picked-up sound noise included in the smartphone-recorded signal. In this case, the picked up sound noise is not removed by a filter, and instead, the picked-up sound noise is removed using the deep neural network 610. Therefore, an audio signal that should not be removed as fundamentals is not removed, so that the sound quality of the audio signal is not impaired, and non-stationary noise that occurs suddenly in addition to periodic noise and linear noise can also be removed satisfactorily.

Figure 7:
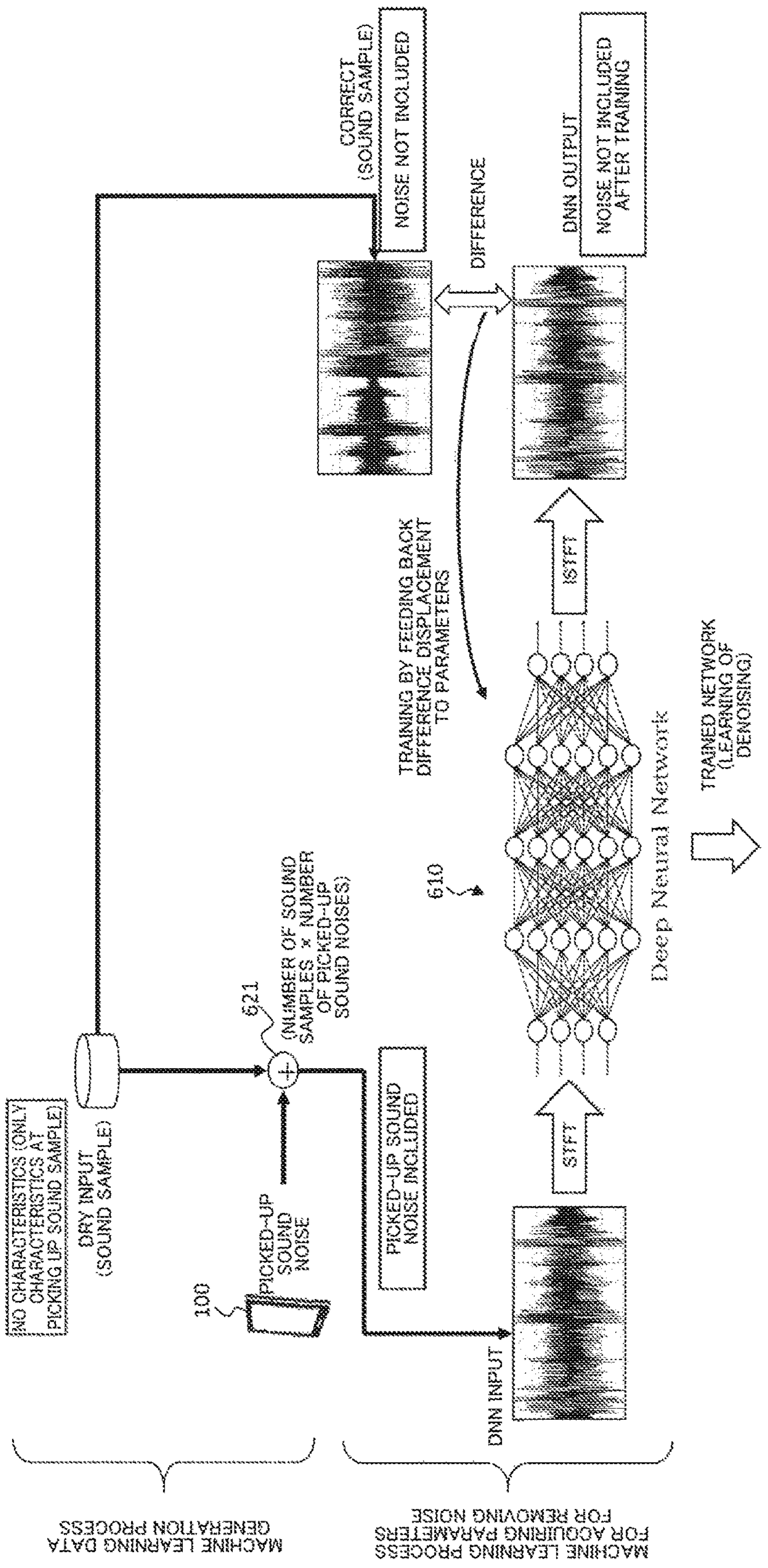
FIG. 7 is a diagram illustrating an example of processing of training a deep neural network that constitutes the denoise.

FIG. 7 illustrates an example of processing of training the deep neural network 610 that constitutes the denoise 600 of FIG. 6. This processing of training includes a machine learning data generation process and a machine learning process for acquiring parameters for removing noise.

First, the machine learning data generation process will be described. An adder 621 adds the picked-up sound noise picked up by the built-in microphone 101 of the smartphone 100 to a sound sample serving as a dry input that includes only the characteristics at the time of picking up the sound sample, to generate an input for training the deep neural network 610. In this case, it is possible to obtain learning data corresponding to "the number of sound samples×the number of picked-up sound noises".

Next, the machine learning process will be described. The sound sample (DNN input), including picked-up sound noise, obtained by the adder 621, is transformed by the short-time Fourier transform (STFT) and input to the deep neural network 610. Then, a difference is calculated between an audio signal (DNN output) obtained by transforming the output of the deep neural network 610 by the inverse short-time Fourier transform (ISTFT) and the sound sample serving as the dry input given as the correct answer, and the deep neural network 610 is trained by feeding back the difference displacement to parameters. The audio signal (DNN output) after training does not include noise.

Figure 8:
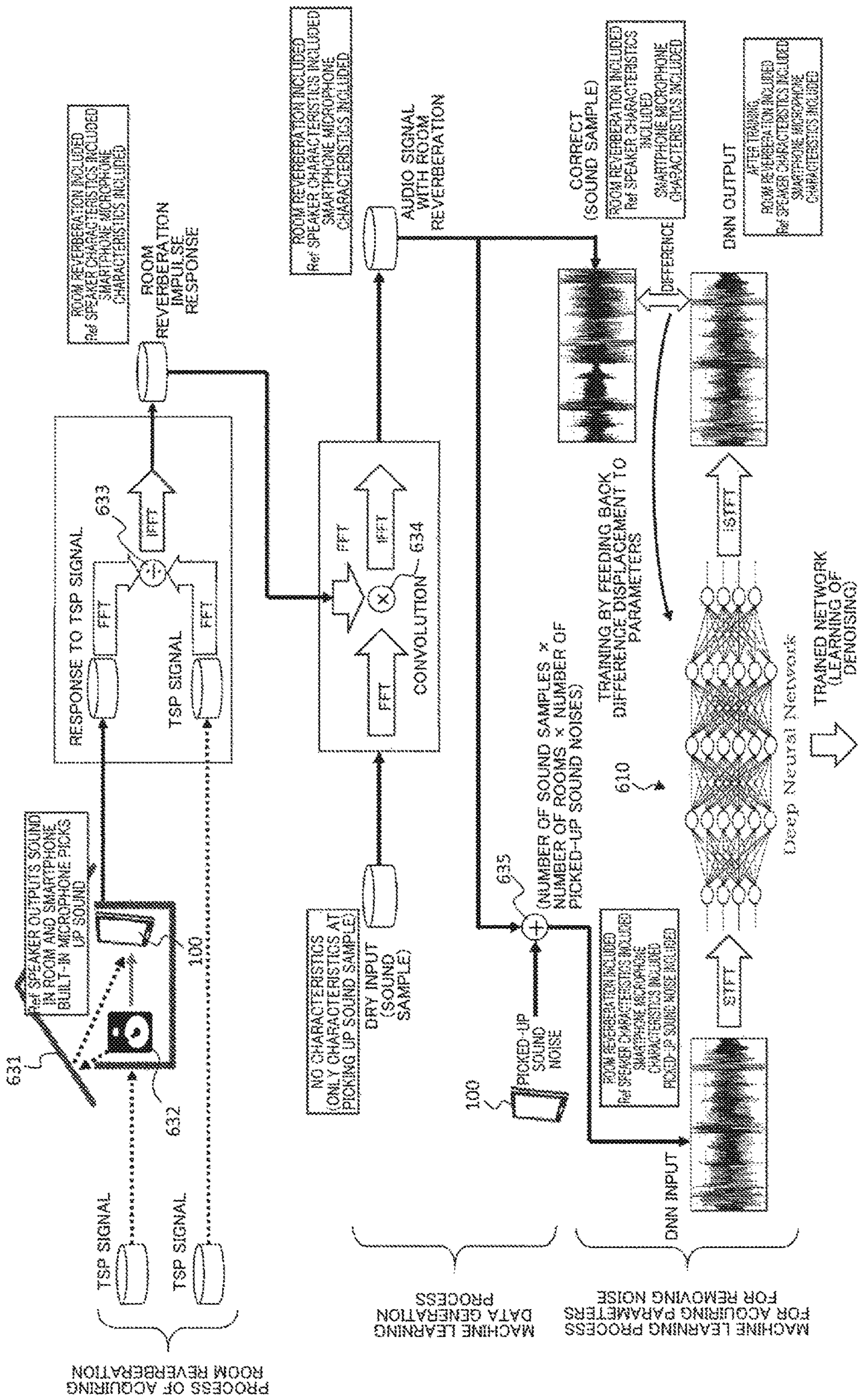
FIG. 8 is a diagram illustrating another example of processing of training the deep neural network that constitutes the denoise.

FIG. 8 illustrates another example of processing of training the deep neural network 610 that constitutes the denoise 600 of FIG. 6. This processing of training includes a process of acquiring room reverberation, a machine learning data generation process, and a machine learning process for acquiring parameters for removing noise.

First, the process of acquiring room reverberation will be described. A reference speaker 632 outputs sound based on a time stretched pulse (TSP) signal in a room 631, and the built-in microphone 101 of the smartphone 100 picks up the sound, so that a response to the TSP signal can be obtained. A divider 633 divides a fast Fourier transform (FFT) output of the response to the TSP signal by a fast Fourier transform (FFT) output of the TSP signal, and transforms the resulting value by the inverse fast Fourier transform (IFFT) to acquire a room reverberation impulse response.

This room reverberation impulse response includes room reverberation, includes the characteristics of the reference speaker 632, and includes the characteristics of the built-in microphone of the smartphone 100. By using the TSP signal itself instead of the response to the TSP signal as the denominator of the complex division, a stable and accurate finite impulse response (FIR) solution can be obtained as the room reverberation impulse response.

Next, the machine learning data generation process will be described. A multiplier 634 multiplies a fast Fourier transform (FFT) output of a sound sample serving as a dry input that includes only the characteristics at the time of picking up the sound sample by a fast Fourier transform (FFT) output of the room reverberation impulse response, and transforms the resulting value by the inverse fast Fourier transform (IFFT), that is, convolves the sound sample serving as the dry input with the room reverberation impulse response, to generate an audio signal with room reverberation. This audio signal with room reverberation includes the room reverberation of the room 631, includes the characteristics of the reference speaker 632, and includes the characteristics of the built-in microphone 101 of the smartphone 100.

Then, an adder 635 adds the picked-up sound noise picked up by the built-in microphone 101 of the smartphone 100 to the audio signal with room reverberation, to generate an input for training the deep neural network 610. This input includes the room reverberation of the room 631, includes the characteristics of the reference speaker 632, includes the characteristics of the built-in microphone 101 of the smartphone 100, and even includes the picked-up sound noise. In this case, it is possible to obtain learning data corresponding to "the number of sound samples×the number of rooms×the number of picked-up sound noises".

Next, the machine learning process will be described. The audio signal with room reverberation, including the picked-up sound noise, obtained by the adder 635 is transformed by the short-time Fourier transform (STFT) and input to the deep neural network 610. Then, a difference is calculated between an audio signal (DNN output) obtained by transforming the output of the deep neural network 610 by the inverse short-time Fourier transform (ISTFT) and the audio signal with room reverberation given as the correct answer, and the deep neural network 610 is trained by feeding back the difference displacement to parameters. The audio signal (DNN output) does not include noise after training, but includes the room reverberation of the room 631, the characteristics of the reference speaker 632, and the characteristics of the built-in microphone 101 of the smartphone 100.

In the processing of training illustrated in FIG. 8, training is performed using the audio signal with room reverberation, making it possible to expect to have a greater effect of noise reduction in a sound pickup environment with high reverberation, and also to expand the number of training data by generating and using a plurality of reverberation patterns for the training for the same dry input.

Returning to FIG. 6, the dereverberator 700 uses a deep neural network (deep neural network, DNN) 710 trained to remove room reverberation to remove room reverberation from the smartphone-recorded signal, serving as an input audio signal and output from the denoise 600, in which the picked-up sound noise is removed. This input audio signal includes room reverberation corresponding to the room in which sound is picked up, includes the characteristics of the built-in microphone of the smartphone 100, and includes picked-up sound noise that is noise that is mixed during sound pickup.

The input audio signal is transformed by the short-time Fourier transform (STFT), and the resulting signal is used as an input of the deep neural network 710. Then, the output of the deep neural network 710 is transformed by the inverse short-time Fourier transform (ISTFT), and the resulting signal is used as a smartphone-recorded signal, serving as the output signal of the dereverberator 700, in which the picked-up sound noise and the room reverberation are removed. The smartphone-recorded signal in which the picked up sound noise and the room reverberation are removed includes the reverse characteristics of the reference speaker used to obtain the room reverberation impulse response in training.

As described above, the dereverberator 700 illustrated in FIG. 6 can satisfactorily remove room reverberation included in the smartphone-recorded signal. In this case, the deep neural network 710 is used to remove room reverberation and to estimate and output only the direct sound, not to perform an inverse operation of adding reverberation, and makes it possible to avoid the divergence of solution and thus to perform the removal of room reverberation satisfactory. Also in this case, depending on an equipment installation method for reverberation measurement (a reference speaker being fixed at the front, and a microphone (smartphone) being oriented in various directions), it is possible to eliminate the influence of the directional characteristics (polar pattern) of the speaker, while achieving the robustness of how the vocalist holds the microphone.

Figure 9:
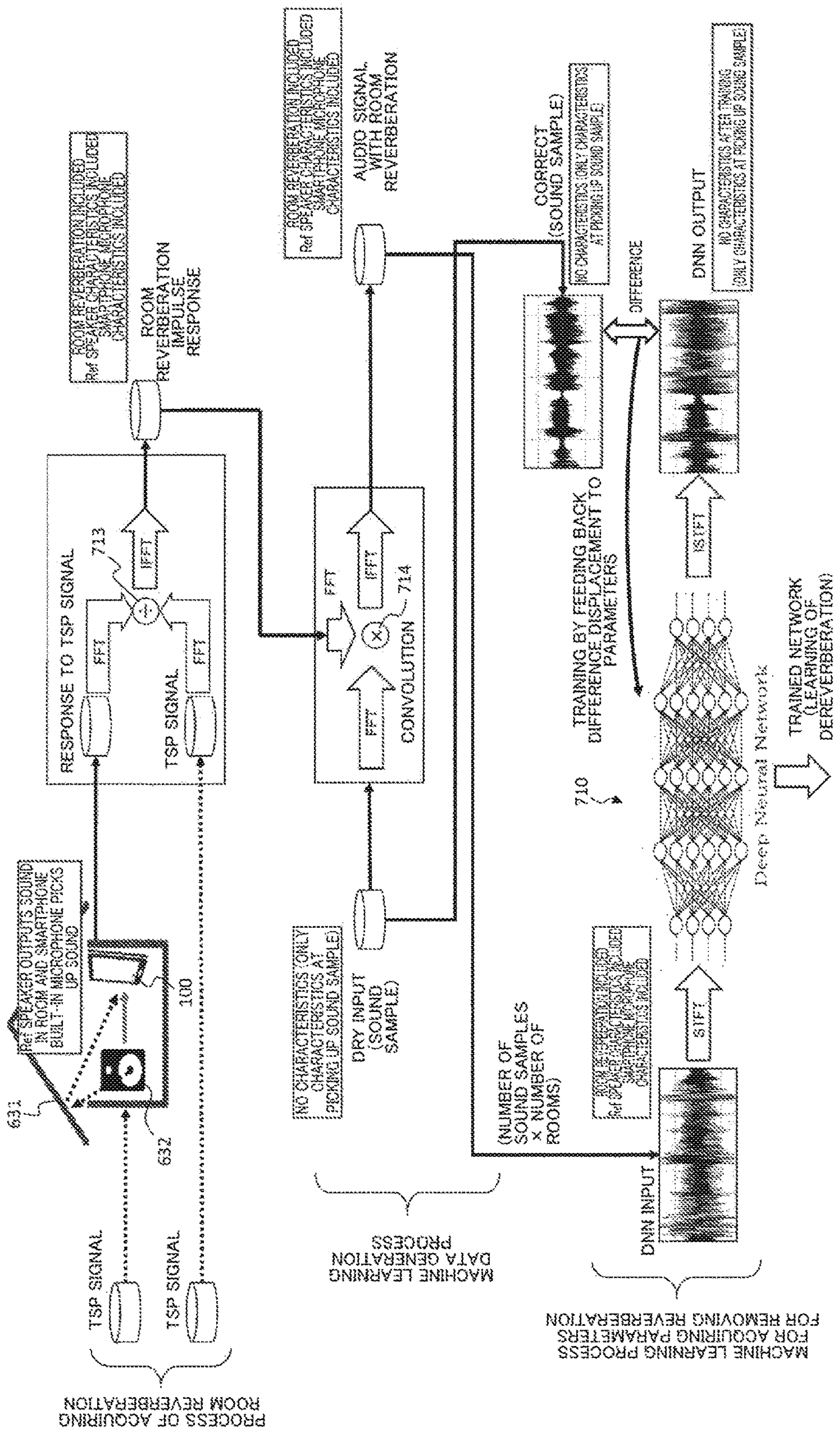
FIG. 9 is a diagram illustrating an example of processing of training a deep neural network that constitutes the dereverberator.

FIG. 9 illustrates an example of processing of training the deep neural network 710 that constitutes the dereverberator 700 of FIG. 6. This processing of training includes a process of acquiring room reverberation, a machine learning data generation process, and a machine learning process for acquiring parameters for removing reverberation.

First, the process of acquiring room reverberation will be described. A reference speaker 632 outputs sound based on a TSP signal in a room 631, and the built-in microphone 101 of the smartphone 100 picks up the sound, so that a response to the TSP signal can be obtained. A divider 713 divides a fast Fourier transform (FFT) output of the response to the TSP signal by a fast Fourier transform (FFT) output of the TSP signal, and transforms the resulting value by the inverse fast Fourier transform (IFFT) to acquire a room reverberation impulse response.

This room reverberation impulse response includes room reverberation of the room 631, includes the characteristics of the reference speaker 632, and includes the characteristics of the built-in microphone 101 of the smartphone 100. By using the TSP signal itself instead of the response to the TSP signal as the denominator of the complex division, a stable and accurate finite impulse response (FIR) solution can be obtained as the room reverberation impulse response.

Next, the machine learning data generation process will be described. A multiplier 714 multiplies a fast Fourier transform (FFT) output of a sound sample serving as a dry input that includes only the characteristics at the time of picking up the sound sample by a fast Fourier transform (FFT) output of the room reverberation impulse response, and transforms the resulting value by the inverse fast Fourier transform (IFFT), that is, convolves the sound sample serving as the dry input with the room reverberation impulse response, to generate an audio signal with room reverberation as an input for training the deep neural network 710.

This audio signal with room reverberation includes the room reverberation of the room 631, includes the characteristics of the reference speaker 632, and includes the characteristics of the built-in microphone 101 of the smartphone 100. In this case, it is possible to obtain learning data corresponding to "the number of sound samples×the number of rooms".

Next, the machine learning process will be described. The audio signal with room reverberation is transformed by the short-time Fourier transform (STFT) and input to the deep neural network 710. Then, a difference is calculated between an audio signal (DNN output) obtained by transforming the output of the deep neural network 710 by the inverse short-time Fourier transform (ISTFT) and the sound sample serving as the dry input given as the correct answer, and the deep neural network 710 is trained by feeding back the difference displacement to parameters. The audio signal (DNN output) after training includes only the characteristics of the dry input at the time of picking up the sound sample.

In the processing of training illustrated in FIG. 9, the reference speaker 632 outputs sound based on the TSP signal and the built-in microphone 101 of the smartphone 100 picks up the sound to generate the room reverberation impulse response, and if the input audio signal includes the characteristics of the built-in microphone 101 of the smartphone 100, it is possible to train the deep neural network 710 so that the characteristics can be canceled.

Figure 10:
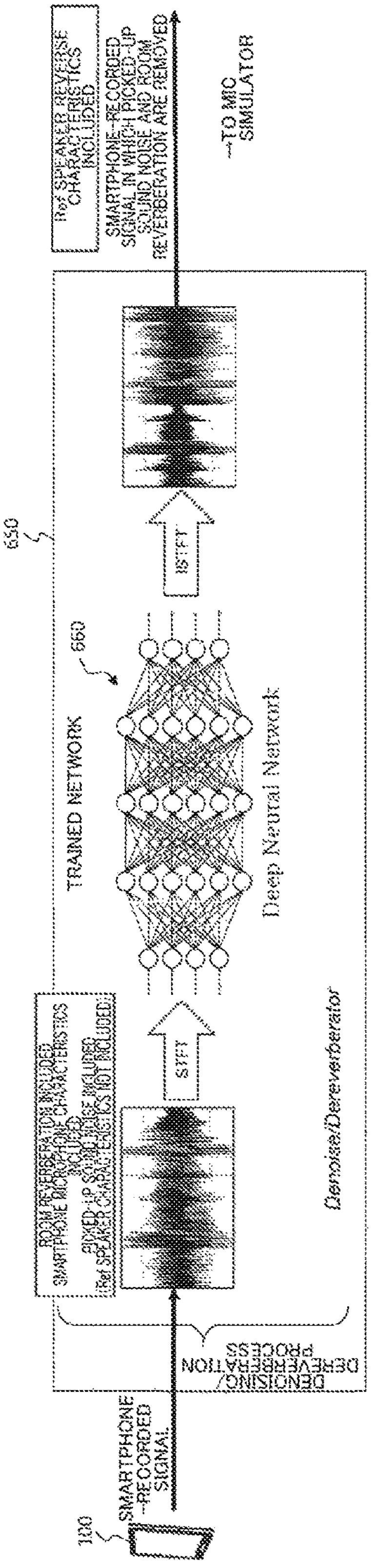
FIG. 10 is a diagram illustrating a configuration example of a denoise/dereverberator having both the functions of the denoise and the dereverberator.

FIG. 10 illustrates a configuration example of a denoise/dereverberator 650 having both the functions of the denoise 600 and the dereverberator 700. The denoise/dereverberator 650 uses a deep neural network (deep neural network, DNN) 660 trained to remove picked-up sound noise and room reverberation to remove picked-up sound noise and room reverberation from a smartphone-recorded signal as the input audio signal (recorded sound source). This input audio signal includes room reverberation corresponding to the room in which sound is picked up, includes the characteristics of the built-in microphone 101 of the smartphone 100, and includes picked-up sound noise that is noise that is mixed during sound pickup.

The input audio signal is transformed by the short-time Fourier transform (STFT), and the resulting signal is used as an input of the deep neural network 660. Then, the output of the deep neural network 660 is transformed by the (ISTFT), and the resulting signal is used as a smartphone-recorded signal, serving as the output signal of the denoise/dereverberator 650, in which the picked-up sound noise and the room reverberation are removed. This smartphone-recorded signal includes the reverse characteristics of the reference speaker used to obtain the room reverberation impulse response in training.

As described above, the denoise/dereverberator 650 illustrated in FIG. 10 can satisfactorily remove the picked-up sound noise and room reverberation included in the smartphone-recorded signal. This case provides a configuration in which one deep neural network 660 is used to remove room reverberation and picked-up sound noise, and the amount of processing in the cloud can be reduced.

Figure 11:
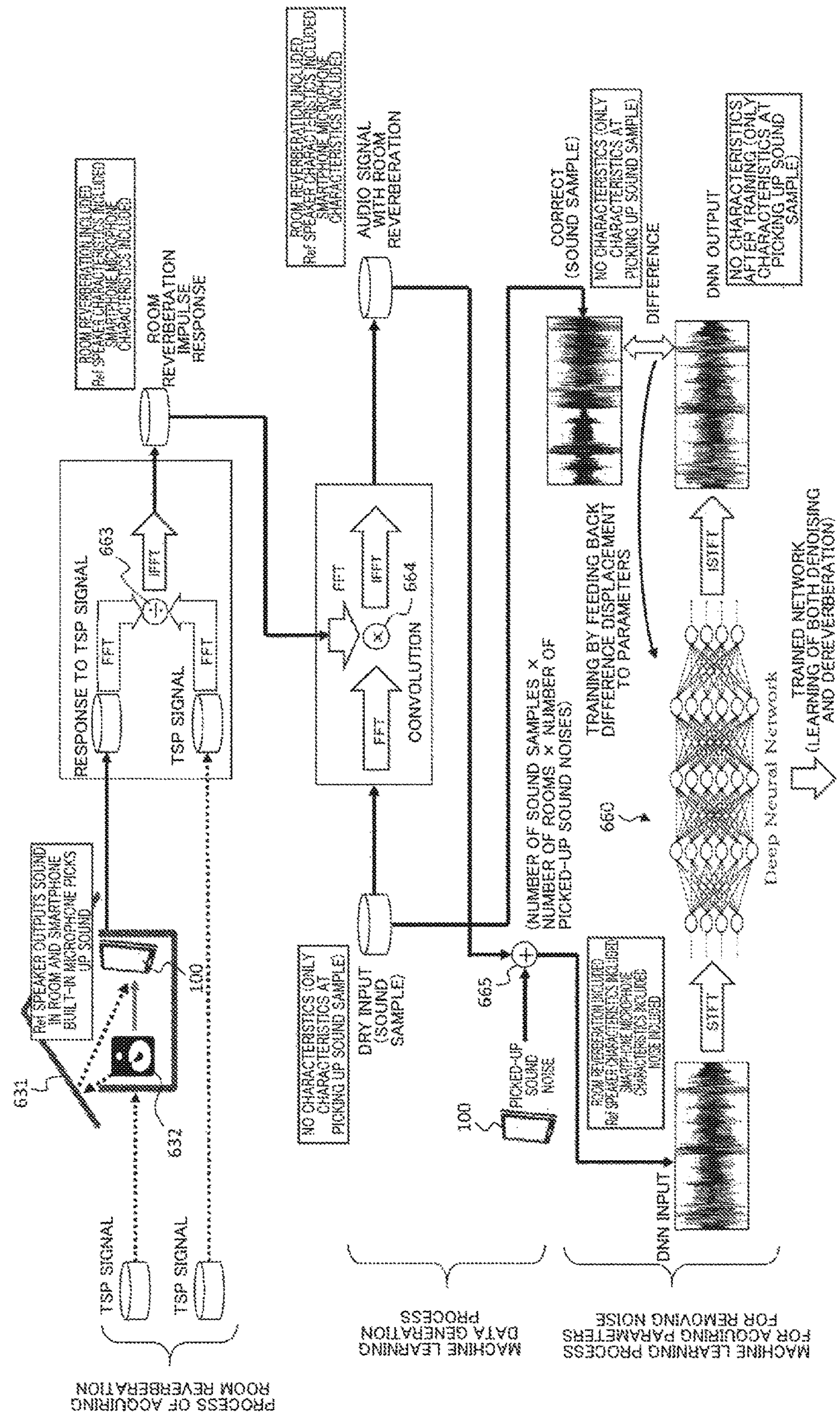
FIG. 11 is a diagram illustrating an example of processing of training a deep neural network that constitutes the denoise/dereverberator.

FIG. 11 illustrates an example of processing of training the deep neural network 660 that constitutes the denoise/dereverberator 650 of FIG. 10. This processing of training includes a process of acquiring room reverberation, a machine learning data generation process, and a machine learning process for acquiring parameters for removing reverberation.

First, the process of acquiring room reverberation processing will be described. A reference speaker 632 outputs sound based on a TSP signal in a room 631, and the built-in microphone 101 of the smartphone 100 picks up the sound, so that a response to the TSP signal can be obtained. A divider 663 divides a fast Fourier transform output of the response to the TSP signal by a fast Fourier transform (FFT) output of the TSP signal, and transforms the resulting value by the inverse fast Fourier transform to acquire a room reverberation impulse response.

This room reverberation impulse response includes room reverberation of the room 631, includes the characteristics of the reference speaker 632, and includes the characteristics of the built-in microphone 101 of the smartphone 100. By using the TSP signal itself instead of the response to the TSP signal as the denominator of the complex division, a stable and accurate finite impulse response (FIR) solution can be obtained as the room reverberation impulse response.

Next, the machine learning data generation process will be described. A multiplier 664 multiplies a fast Fourier transform (FFT) output of a sound sample serving as a dry input that includes only the characteristics at the time of picking up the sound sample by a fast Fourier transform (FFT) output of the room reverberation impulse response, and transforms the resulting value by the inverse fast Fourier transform (IFFT), that is, convolves the sound sample serving as the dry input with the room reverberation impulse response, to generate an audio signal with room reverberation. This audio signal with room reverberation includes the room reverberation of the room 631, includes the characteristics of the reference speaker 632, and includes the characteristics of the built-in microphone 101 of the smartphone 100.

Then, an adder 665 adds the picked up sound noise picked up by the built-in microphone 101 of the smartphone 100 to the audio signal with room reverberation, to generate an input for training the deep neural network 660. This input includes the room reverberation of the room 631, includes the characteristics of the reference speaker 632, includes the characteristics of the built-in microphone 101 of the smartphone 100, and even includes the picked-up sound noise. In this case, it is possible to obtain learning data corresponding to "the number of sound samples×the number of rooms×the number of picked-up sound noises".

Next, the machine learning process will be described. The audio signal with room reverberation (DNN input) including the picked-up sound noise obtained by the adder 665 is transformed by the short-time Fourier transform (STFT) and input to the deep neural network 660. Then, a difference is calculated between an audio signal (DNN output) obtained by transforming the output of the deep neural network 660 by the inverse short-time Fourier transform (ISTFT) and the sound sample serving as the dry input given as the correct answer, and the deep neural network 660 is trained by feeding back the difference displacement to parameters. The audio signal (DNN output) after training includes only the characteristics of the dry input at the time of picking up the sound sample.

Figure 12:
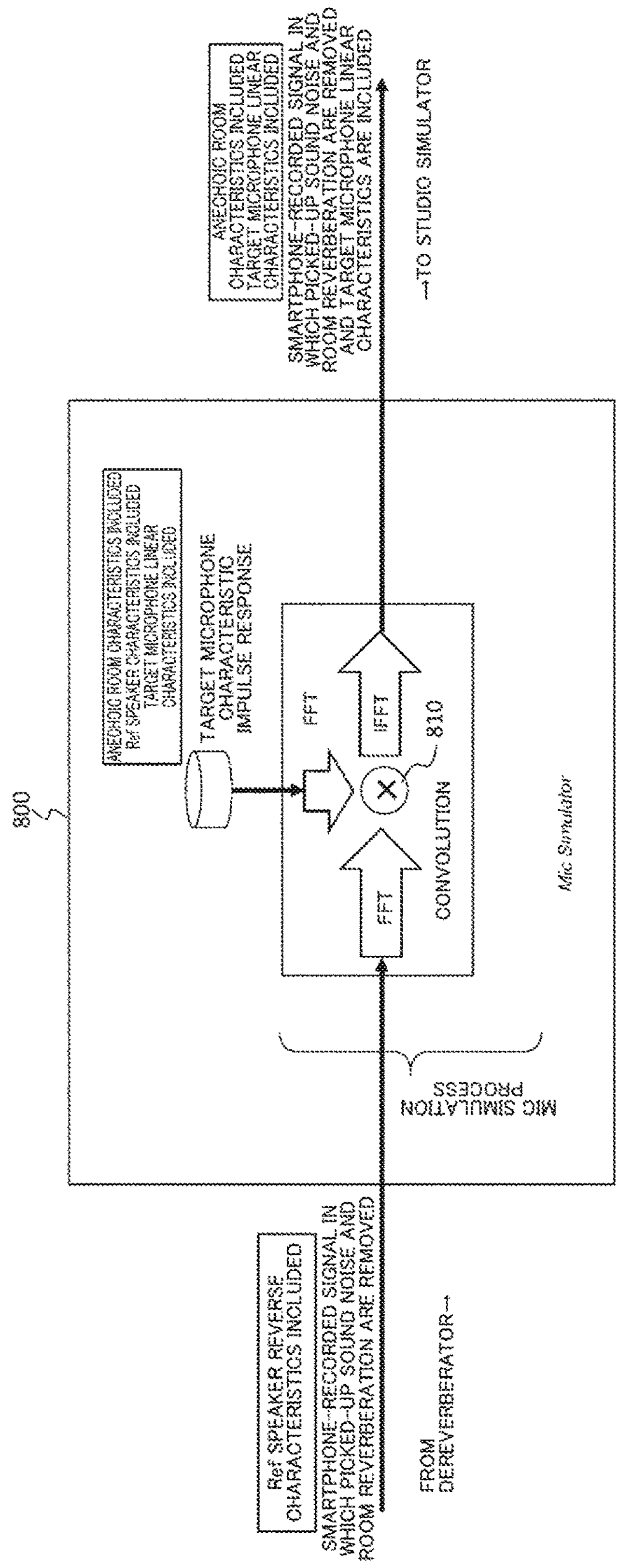
FIG. 12 is a diagram illustrating a configuration example of a mic simulator.

FIG. 12 illustrates a configuration example of a mic simulator 800. The mic simulator 800 includes the non-linear characteristics of the target microphone into the smartphone-recorded signal, serving as an input audio signal and output from the dereverberator 700 (see FIG. 6) or the denoise/dereverberator 650 (see FIG. 10), in which the picked-up sound noise and the room reverberation are removed. This input audio signal includes the reverse characteristics of the reference speaker.

In this case, a multiplier 810 multiplies a fast Fourier transform (FFT) output of the input audio signal by a fast Fourier transform (FFT) output of a target microphone characteristic impulse response, and transforms the resulting value by the inverse fast Fourier transform (IFFT), that is, convolves the input audio signal with the target microphone characteristic impulse response, to obtain an output audio signal of the mic simulator 800.

The target microphone characteristic impulse response includes the characteristics of an anechoic room, the characteristics of the reference speaker, and the linear characteristics of the target microphone. Thus, this output audio signal includes the characteristics of the anechoic room and the linear characteristics of the target microphone.

Therefore, as an output audio signal of the mic simulator 800, a smartphone-recorded signal is obtained in which the picked-up sound noise and the room reverberation are removed and the linear characteristics of the target microphone are obtained. The reverse characteristics of the reference speaker included in the input audio signal is canceled because the target microphone characteristic impulse response includes the characteristics of the reference speaker.

As described above, the mic simulator 800 illustrated in FIG. 12 can include the linear characteristics of the target microphone into the smartphone-recorded signal satisfactorily. The target mic simulator 800 also uses the target microphone characteristic impulse response including the characteristics of the reference speaker, so that the reverse characteristics of the reference speaker included in the input audio signal can be canceled.

Figure 13:
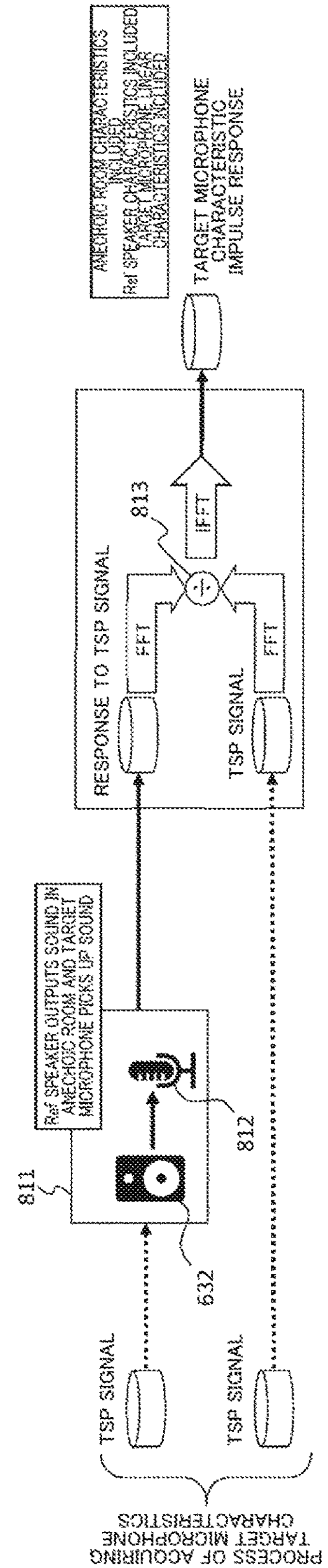
FIG. 13 is a diagram illustrating an example of processing of generating a target microphone characteristic impulse response used in the mic simulator.

FIG. 13 illustrates an example of processing for generating a target microphone characteristic impulse response used in the mic simulator 800 of FIG. 12. This processing of generating includes a process of acquiring the characteristics of the target microphone.

The process of acquiring the target microphone characteristics will be described. A reference speaker 632 outputs sound based on a TSP signal in an anechoic room 811, and a target microphone 812 picks up the sound, so that a response to the TSP signal can be obtained. Then, a divider 813 divides a fast Fourier transform (FFT) output of the response to the TSP signal by a fast Fourier transform (FFT) output of the TSP signal, and transforms the resulting value by the inverse fast Fourier transform (IFFT) to acquire a target microphone characteristic impulse response. This target microphone characteristic impulse response includes the characteristics of the anechoic room, the characteristics of the reference speaker 632, and the linear characteristics of the target microphone 812.

Figure 14:
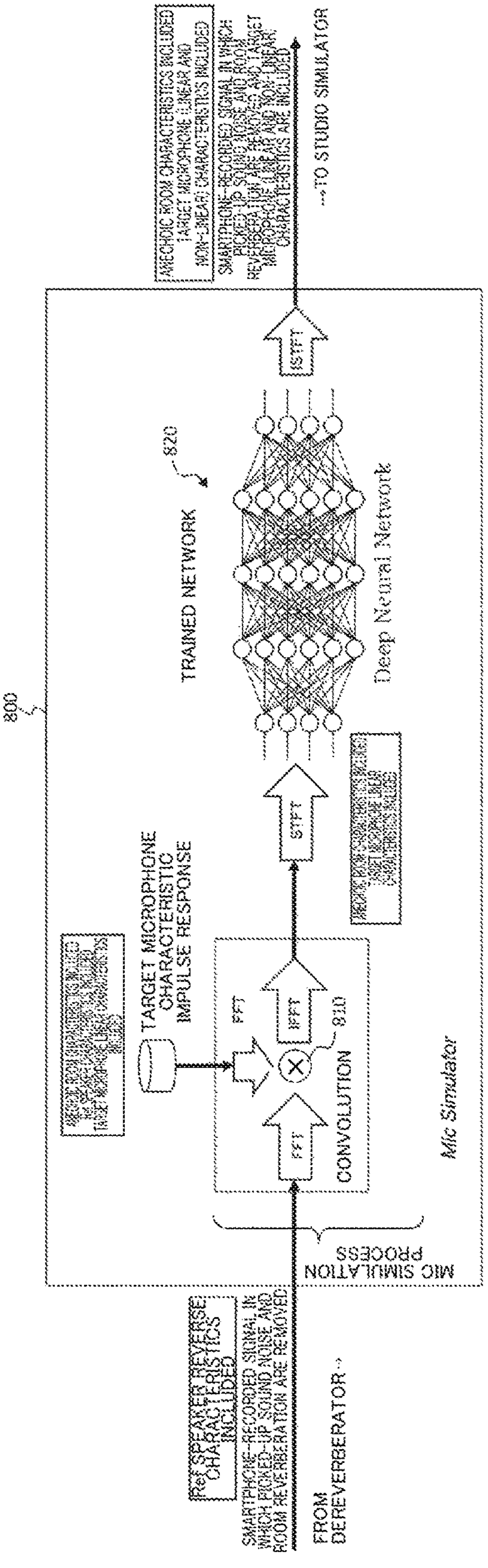
FIG. 14 is a diagram illustrating another configuration example of the mic simulator.

FIG. 14 illustrates another configuration example of the mic simulator 800. This mic simulator 800 includes the (linear and non-linear) characteristics of the target microphone into the smartphone-recorded signal, serving as an input audio signal and output from the dereverberator 700 (see FIG. 6) or the denoise/dereverberator 650 (see FIG. 10), in which the picked-up sound noise and the room reverberation are removed. This input audio signal includes the reverse characteristics of the reference speaker.

In this case, as in the mic simulator 800 in FIG. 12, the multiplier 810 multiplies the fast Fourier transform (FFT) output of the input audio signal by the fast Fourier transform (FFT) output of a target microphone characteristic impulse response, and transforms the resulting value by the inverse fast Fourier transform (IFFT), that is, convolves the input audio signal with the target microphone characteristic impulse response, to obtain an audio signal including the linear characteristics of the target microphone.

This audio signal including the linear characteristics of the target microphone is transformed by the short time Fourier transform (STFT) and input to a deep neural network 820. This deep neural network 820 has been trained to include the non-linear characteristics of the target microphone. The output of this deep neural network 820 is transformed to an output audio signal of the mic simulator 800 by the inverse short-time Fourier transform (ISTFT). This output audio signal includes the characteristics of the anechoic room and also includes the (linear and non-linear) characteristics of the target microphone.

Therefore, as an output audio signal of the mic simulator 800, a smartphone-recorded signal is obtained in which the picked up sound noise and the room reverberation are removed and the (linear and non-linear) characteristics of the target microphone are obtained. The reverse characteristics of the reference speaker included in the input audio signal is canceled because the target microphone characteristic impulse response includes the characteristics of the reference speaker.

As described above, the mic simulator 800 illustrated in FIG. 14 can include the (linear and non-linear) characteristics of the target microphone into the smartphone-recorded signal satisfactorily. This target mic simulator 800 also uses the target microphone characteristic impulse response including the characteristics of the reference speaker, so that the reverse characteristics of the reference speaker included in the input audio signal can be canceled.

Figure 15:
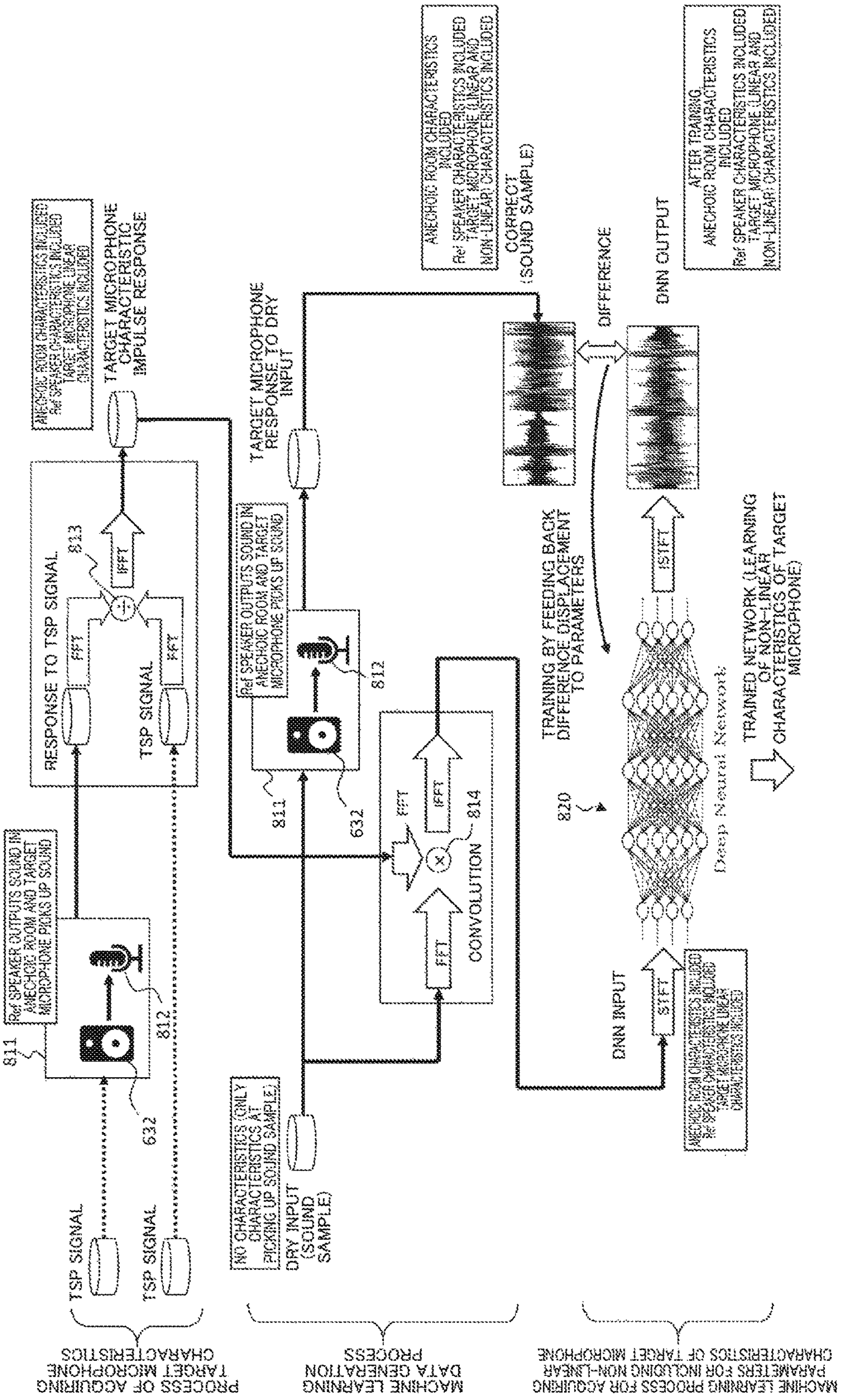
FIG. 15 is a diagram illustrating an example of processing of generating a target microphone characteristic impulse response used in the mic simulator, and processing of training a deep neural network that constitutes the mic simulator.

FIG. 15 illustrates an example of processing of generating a target microphone characteristic impulse response used in the mic simulator 800 of FIG. 14, and processing of training the deep neural network 820 that constitutes the mic simulator 800 of FIG. 14. These types of processing include a process of acquiring the characteristics of the target microphone, a machine learning data generation process, and a machine learning process for acquiring parameters for including the non-linear characteristics of the target microphone.

First, the process of acquiring the target microphone characteristics will be described. A reference speaker 632 outputs sound based on a TSP signal in an anechoic room 811, and a target microphone 812 picks up the sound, so that a response to the TSP signal can be obtained. Then, a divider 813 divides a fast Fourier transform (FFT) output of the response to the TSP signal by a fast Fourier transform (FFT) output of the TSP signal, and transforms the resulting value by the inverse fast Fourier transform (IFFT) to acquire a target microphone characteristic impulse response. This target microphone characteristic impulse response includes the characteristics of the anechoic room, the characteristics of the reference speaker 632, and the linear characteristics of the target microphone 812.

Next, the machine learning data generation process will be described. A multiplier 814 multiplies a fast Fourier transform (FFT) output of a sound sample serving as a dry input that includes only the characteristics at the time of picking up the sound sample by a fast Fourier transform (FFT) output of the target microphone characteristic impulse response, and transforms the resulting value by the inverse fast Fourier transform (IFFT), that is, convolves the sound sample serving as the dry input with the target microphone characteristic impulse response, to generate an input for training the deep neural network 820. This input includes the characteristics of the anechoic room, includes the characteristics of the reference speaker 632, and includes the linear characteristics of the target microphone 812. In this case, it is possible to obtain learning data corresponding to "the number of sound samples".

The reference speaker 632 outputs sound with a sound sample serving as a dry input in the anechoic room 811 and the target microphone 812 picks up the sound, so that a target microphone response to the sound sample serving as the dry input given as the correct answer for training the deep neural network 820 is obtained. This target microphone response includes the characteristics of the anechoic room, includes the characteristics of the reference speaker 632, and includes the (linear and non-linear) characteristics of the target microphone 812.

Next, the machine learning process will be described. The audio signal (DNN input) obtained by convolving the sound sample serving as the dry input with the target microphone characteristic impulse response is transformed by the short-time Fourier transform (STFT) and input to the deep neural network 820. Then, a difference is calculated between an audio signal (DNN output) obtained by transforming the output of the deep neural network 820 by the inverse short-time Fourier transform (ISTFT) and the target microphone response to the sound sample serving as the dry input given as the correct answer, and the deep neural network 820 is trained by feeding back the difference displacement to parameters. The audio signal (DNN output) after training includes the characteristics of the anechoic room, includes the characteristics of the reference speaker 632, and includes the (linear and non-linear) characteristics of the target microphone 812.

Figure 16:
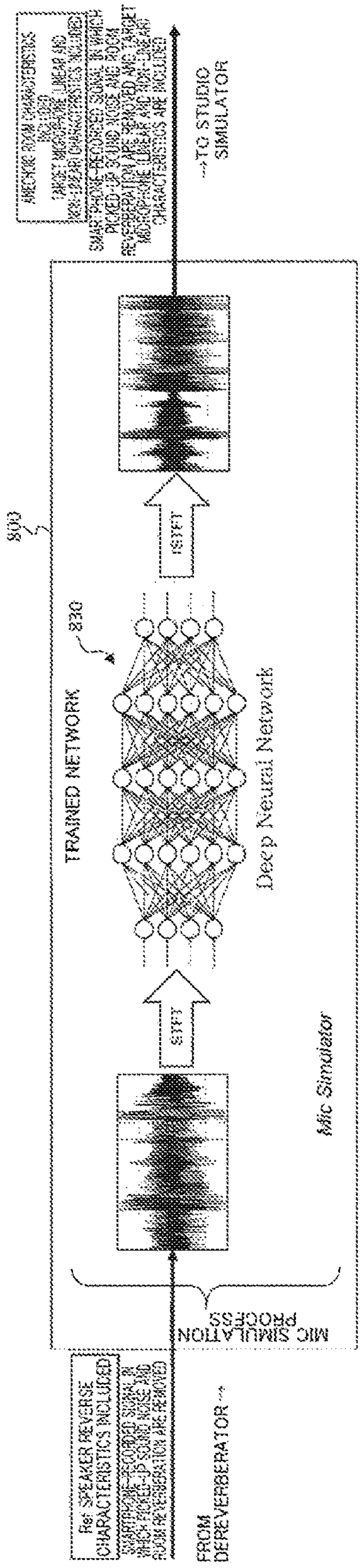
FIG. 16 is a diagram illustrating still another configuration example of the mic simulator.

FIG. 16 illustrates still another configuration example of the mic simulator 800. This mic simulator 800 uses a deep neural network 830 trained to include the target microphone characteristics to include the (linear and non-linear) characteristics of the target microphone into the smartphone-recorded signal, serving as an input audio signal and output from the dereverberator 700 (see FIG. 6) or the denoise/dereverberator 650 (see FIG. 10), in which the picked-up sound noise and the room reverberation are removed. This input audio signal includes the reverse characteristics of the reference speaker.

In this case, the audio signal is transformed by the short-time Fourier transform (STFT) and input to the deep neural network 830. This deep neural network 830 has been trained to include the (linear and non-linear) characteristics of the target microphone and also the characteristics of the reference speaker into the input audio signal. The output of this deep neural network 830 is transformed to an output audio signal of the mic simulator 800 by the inverse short-time Fourier transform (ISTFT).

This output audio signal includes the characteristics of the anechoic room, the (linear and non-linear) characteristics of the target microphone, and does not include the characteristics of the reference speaker. Therefore, as an output audio signal of the mic simulator 800, a smartphone-recorded signal is obtained in which the picked-up sound noise and the room reverberation are removed and the (linear and non-linear) characteristics of the target microphone are obtained. The reverse characteristics of the reference speaker included in the input audio signal is canceled because the target microphone characteristic impulse response includes the characteristics of the reference speaker.

As described above, the mic simulator 800 illustrated in FIG. 16 can include the (linear and non-linear) characteristics of the target microphone into the smartphone-recorded signal satisfactorily, and the configuration can be simpler than the case where linear conversion processing and non-linear conversion processing are separated as illustrated in FIG. 14. Since the deep neural network 830 has been trained to include the characteristics of the reference speaker into the input audio signal, the reverse characteristics of the reference speaker included in the input audio signal can be canceled.

Figure 17:
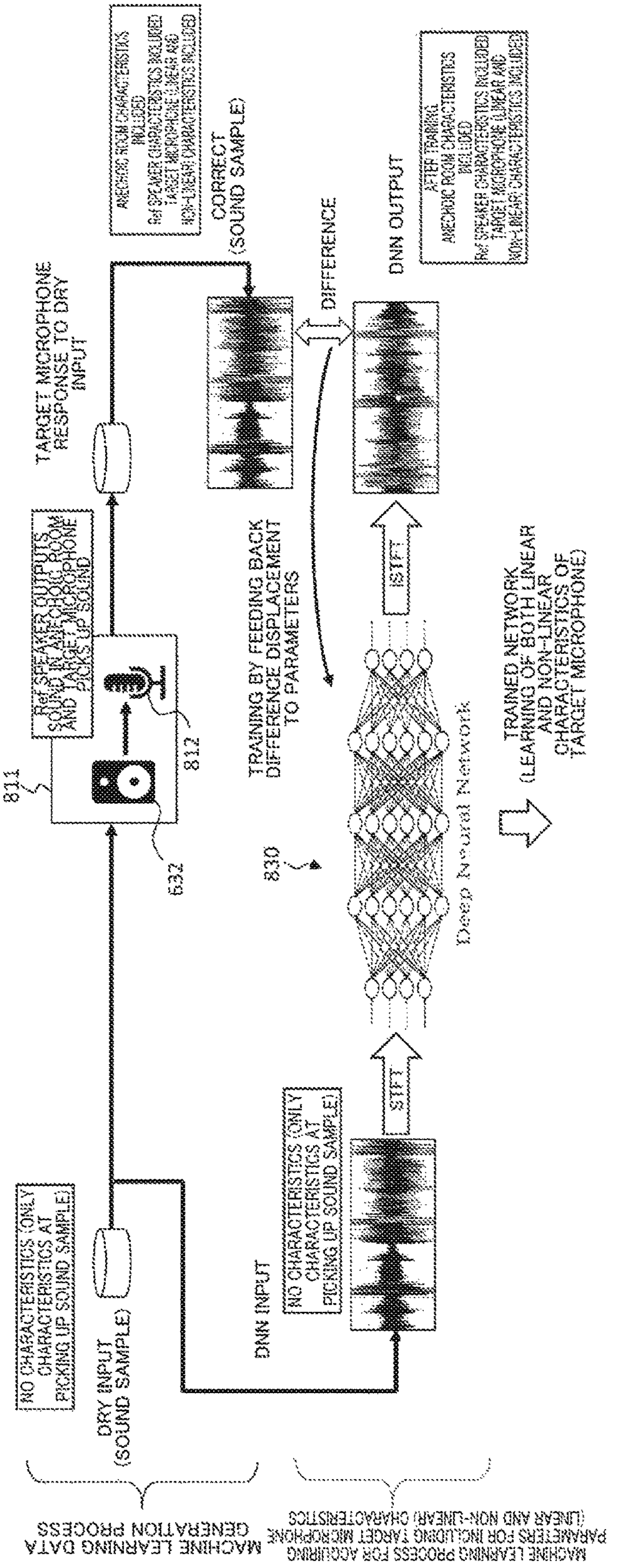
FIG. 17 is a diagram illustrating an example of processing of training a deep neural network that constitutes the mic simulator.

FIG. 17 illustrates an example of processing of training the deep neural network 830 that constitutes the mic simulator 800 of FIG. 16. This processing of training includes a machine learning data generation process and a machine learning process for acquiring parameters for including the (linear and non-linear) characteristics of the target microphone.

First, the machine learning data generation process will be described. The sound sample as a dry input is directly used as an input for training the deep neural network 830. In this case, it is possible to obtain learning data corresponding to "the number of sound samples". The reference speaker 632 outputs sound with a sound sample serving as a dry input in the anechoic room 811 and the target microphone 812 picks up the sound, so that a target microphone response to the sound sample serving as the dry input given as the correct answer for training the deep neural network 830 is obtained. This target microphone response includes the characteristics of the anechoic room, includes the characteristics of the reference speaker 632, and includes the (linear and non-linear) characteristics of the target microphone 812.

Next, the machine learning process will be described. The sound sample (DNN input) serving as the dry input is transformed by the short-time Fourier transform (STFT) and input to the deep neural network 830. Then, a difference is calculated between an audio signal (DNN output) obtained by transforming the output of the deep neural network 830 by the inverse short-time Fourier transform (ISTFT) and the target microphone response to the sound sample serving as the dry input given as the correct answer, and the deep neural network 830 is trained by feeding back the difference displacement to parameters. The audio signal (DNN output) after training includes the characteristics of the anechoic room, includes the characteristics of the reference speaker 632, and includes the (linear and non-linear) characteristics of the target microphone 812.

Figure 18:
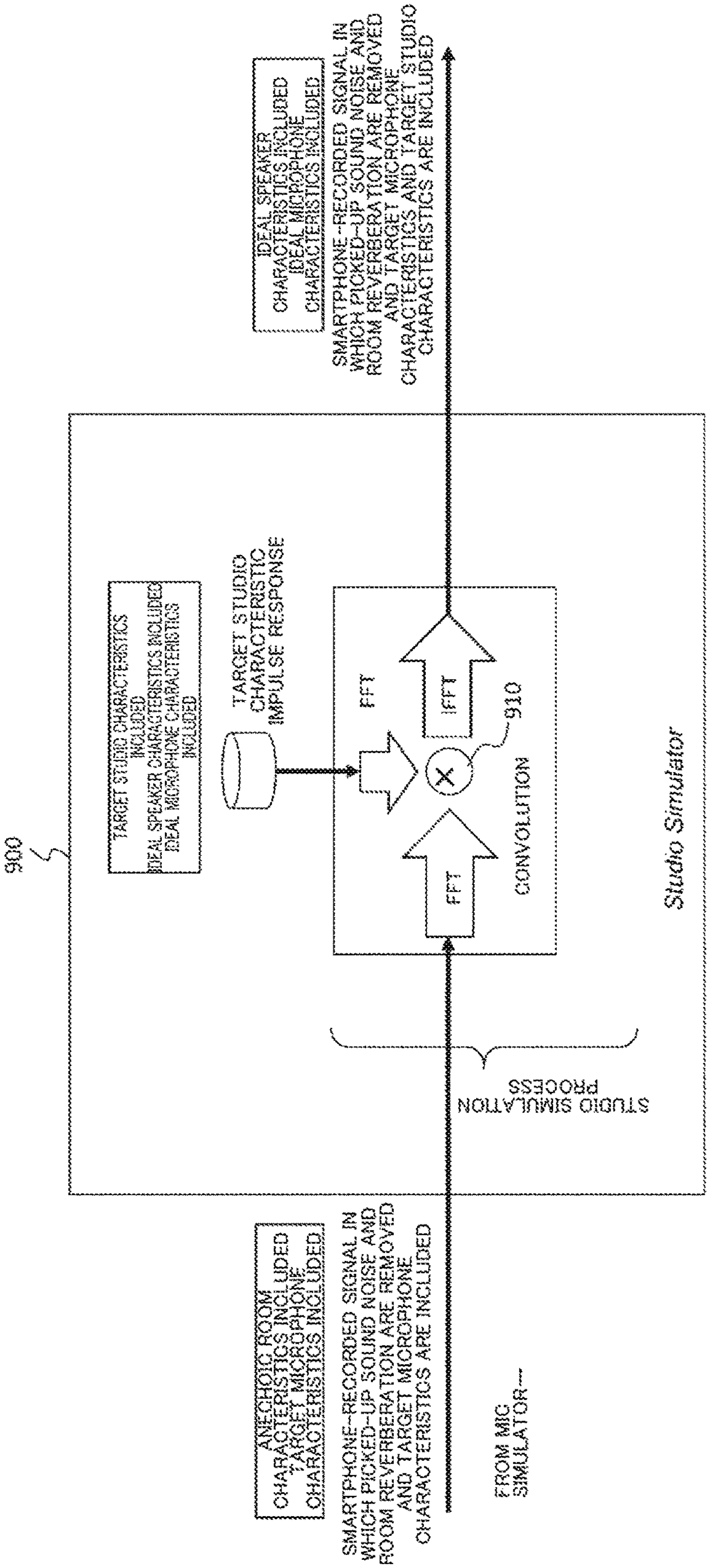
FIG. 18 is a diagram illustrating a configuration example of a studio simulator.

FIG. 18 illustrates a configuration example of a studio simulator 900. The studio simulator 900 includes the target studio characteristics into the smartphone-recorded signal, serving as an input audio signal and output from the mic simulator 800 (see FIG. 12, FIG. 14, and FIG. 16), in which the picked-up sound noise and the room reverberation are removed and the target microphone characteristics are included.

In this case, a multiplier 910 multiplies a fast Fourier transform (FFT) output of the input audio signal by a fast Fourier transform (FFT) output of a target studio characteristic impulse response, and transforms the resulting value by the inverse fast Fourier transform (IFFT), that is, convolves the input audio signal with the target studio characteristic impulse response, to obtain an output audio signal of the studio simulator 900.

The target studio characteristic impulse response includes target studio characteristics, ideal speaker characteristics, and ideal microphone characteristics. Therefore, as an output audio signal of the studio simulator 900, a smartphone-recorded signal is obtained in which the picked-up sound noise and the room reverberation are removed, and the target microphone characteristics and the target studio characteristics are obtained. This output audio signal includes the ideal speaker characteristics and the ideal microphone characteristics.

As described above, the studio simulator 900 illustrated in FIG. 18 can include the target studio characteristics into the smartphone-recorded signal satisfactorily. Impulse responses may be provided, including a plurality of target studio characteristic impulse responses and existing sampling reverb impulse responses so that the impulse response to be used can be switched and reverb characteristics to be included into the smartphone-recorded signal can be switched as appropriate.

Figure 19:
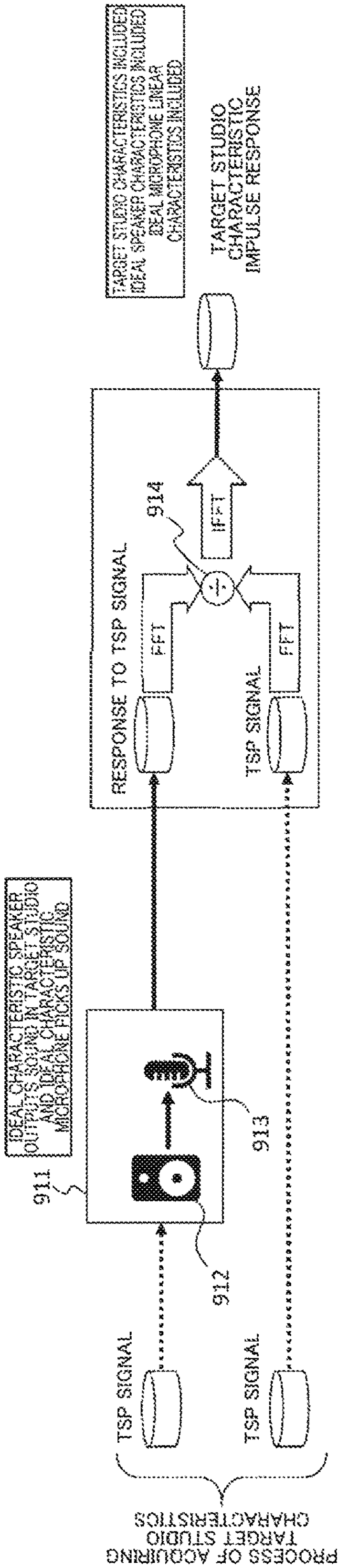
FIG. 19 is a diagram illustrating an example of processing of generating a target studio characteristic impulse response used in the studio simulator.

FIG. 19 illustrates an example of processing of generating a target studio characteristic impulse response used in the studio simulator 900 of FIG. 18. This processing of generating includes a process of acquiring the target studio characteristics.

The process of acquiring the target studio characteristics will be described. An ideal speaker 912 outputs sound based on a TSP signal in a target studio 911, and an ideal microphone 913 picks up the sound, so that a response to the TSP signal can be obtained. Then, a divider 914 divides a fast Fourier transform (FFT) output of the response to the TSP signal by a fast Fourier transform (FFT) output of the TSP signal, and transforms the resulting value by the inverse fast Fourier transform (IFFT) to acquire a target studio characteristic impulse response. This target studio characteristic impulse response includes the target studio characteristics, that is, the reverberation characteristics of the target studio 911, includes the characteristics of the ideal speaker 912, and also includes the linear characteristics of the ideal microphone 913.

Figure 20:
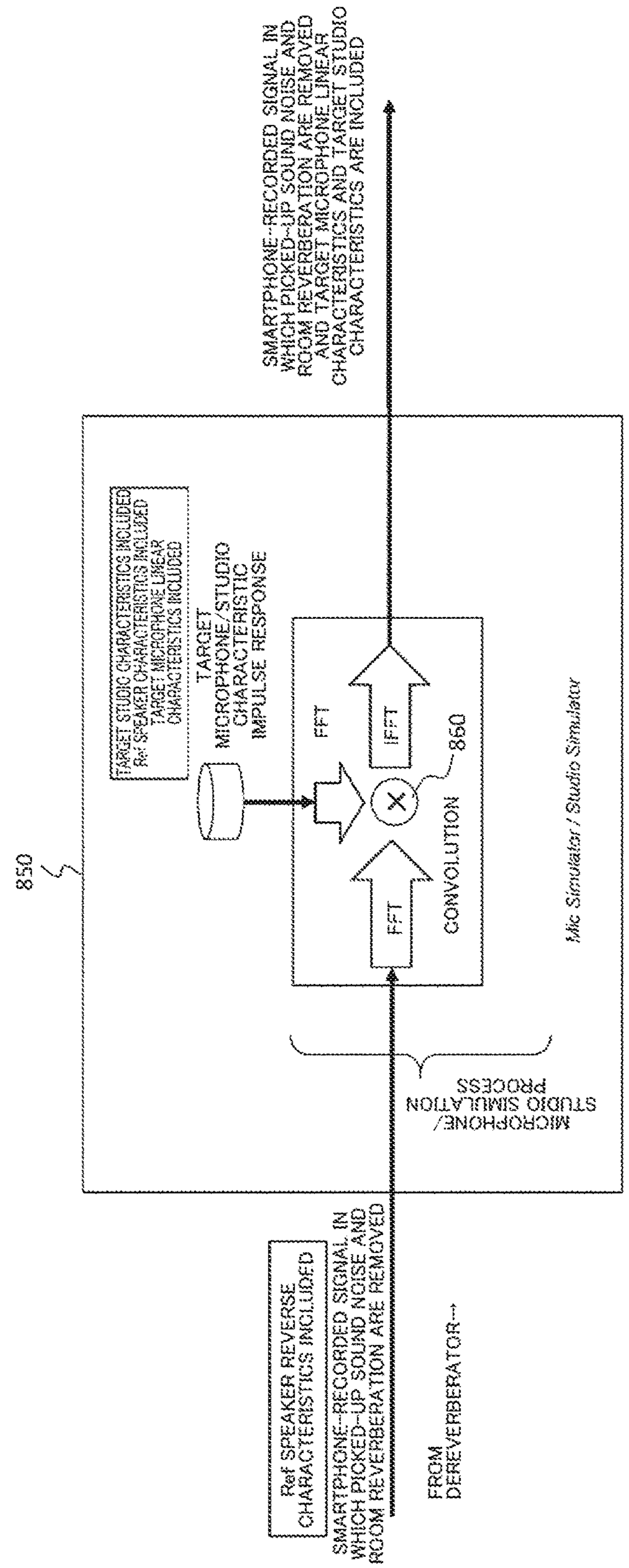
FIG. 20 is a diagram illustrating a configuration example of a mic simulator/studio simulator having both the functions of the mic simulator and the studio simulator.

FIG. 20 illustrates a configuration example of a mic simulator/studio simulator 850 having both the functions of the mic simulator 800 and the studio simulator 900. The mic simulator/studio simulator 850 includes the target microphone characteristics and the target studio characteristics into the smartphone-recorded signal, serving as an input audio signal and output from the dereverberator 700 (see FIG. 6) or the denoise/dereverberator 650 (see FIG. 10), in which the picked-up sound noise and the room reverberation are removed. This input audio signal includes the reverse characteristics of the reference speaker.

In this case, a multiplier 860 multiplies a fast Fourier transform (FFT) output of the input audio signal by a fast Fourier transform (FFT) output of a target microphone/studio characteristic impulse response, and transforms the resulting value by the inverse fast Fourier transform (IFFT), that is, convolves the input audio signal with the target microphone/studio characteristic impulse response, to obtain an output audio signal of the mic simulator/studio simulator 850.

The target microphone/studio characteristic impulse response includes the target studio characteristics, the reference speaker characteristics, and also the target microphone linear characteristics. Thus, this output audio signal includes the target microphone linear characteristics and the target studio characteristics.

Therefore, as an output audio signal of the mic simulator/studio simulator 850, a smartphone-recorded signal is obtained in which the picked-up sound noise and the room reverberation are removed and the target microphone linear characteristics and the target studio characteristics are obtained. The reverse characteristics of the reference speaker included in the input audio signal is canceled because the target microphone/studio characteristic impulse response includes the characteristics of the reference speaker.

As described above, the mic simulator/studio simulator 850 illustrated in FIG. 20 can include the target microphone linear characteristics and the target studio characteristics into the smartphone-recorded signal satisfactorily. In addition, the mic simulator/studio simulator 850 allows the target microphone linear characteristics and the target studio characteristics to be included in the same convolution process, so that the amount of processing in the cloud can be reduced.

Figure 21:
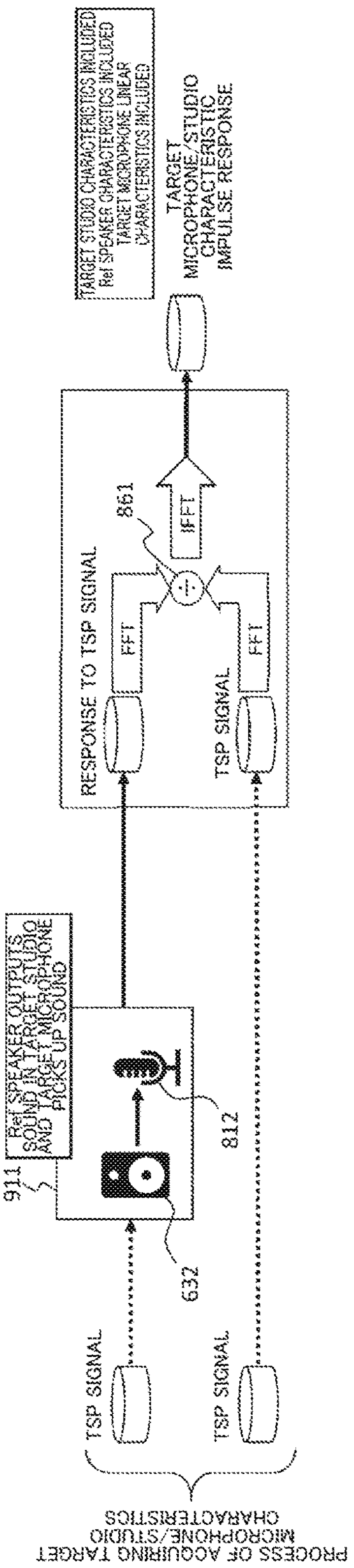
FIG. 21 is a diagram illustrating an example of processing of generating a target microphone/studio characteristic impulse response used in the mic simulator/studio simulator.

FIG. 21 illustrates an example of processing of generating a target microphone/studio characteristic impulse response used in the mic simulator/studio simulator 850 of FIG. 20. This processing of generating includes a process of acquiring the target microphone/studio characteristics.

The process of acquiring the target microphone/studio characteristics will be described. A reference speaker 632 outputs sound based on a TSP signal in a target studio 911, and a target microphone 812 picks up the sound, so that a response to the TSP signal can be obtained. Then, a divider 861 divides a fast Fourier transform (FFT) output of the response to the TSP signal by a fast Fourier transform (FFT) output of the TSP signal, and transforms the resulting value by the inverse fast Fourier transform (IFFT) to acquire a target microphone/studio characteristic impulse response. This target microphone/studio characteristic impulse response includes the target studio characteristics, that is, the reverberation characteristics of the target studio 911, includes the characteristics of the reference speaker 632, and also includes the linear characteristics of the target microphone 812.

Figure 22:
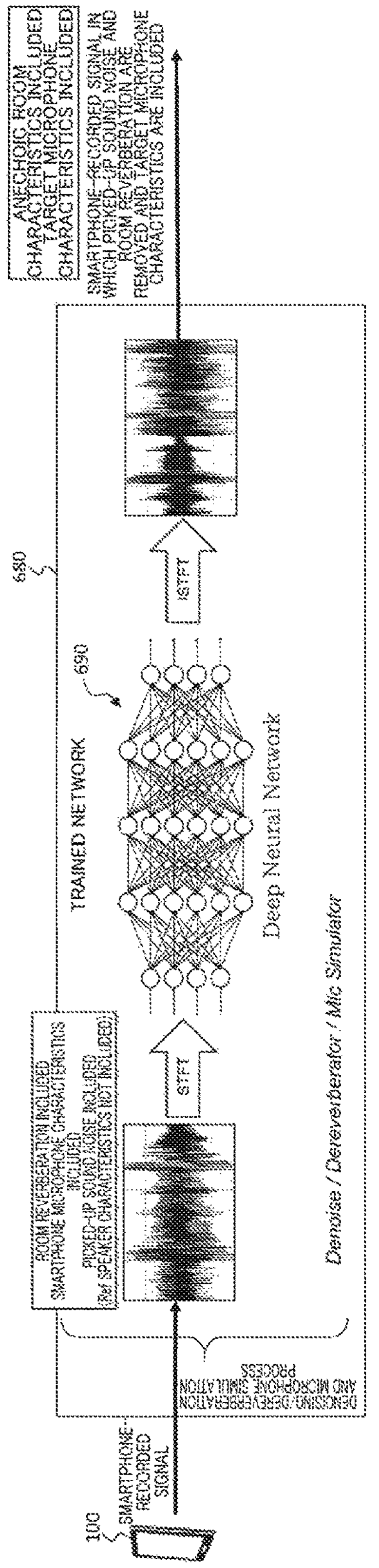
FIG. 22 is a diagram illustrating a configuration example of a denoise/dereverberator/mic simulator having the functions of the denoise, the dereverberator, and the mic simulator.

FIG. 22 illustrates a configuration example of a denoise/dereverberator/mic simulator 680 having the functions of the denoise 600, the dereverberator 700, and the mic simulator 800.

The denoise/dereverberator/mic simulator 680 removes picked-up sound noise and room reverberation from the input audio signal (recorded sound source), and further performs processing of including the target microphone characteristics into it. This input audio signal includes room reverberation corresponding to the room in which sound is picked up, includes the characteristics of the built-in microphone 101 of the smartphone 100, and includes picked-up sound noise that is noise that is mixed during sound pickup.

The denoise/dereverberator/mic simulator 680 uses a deep neural network 690 trained to remove picked-up sound noise and room reverberation and further include the target microphone characteristics to remove picked-up sound noise and room reverberation from the input audio signal and include the target microphone characteristics into this input audio signal.

In this case, the input audio signal is transformed by the short-time Fourier transform (STFT), and the resulting signal is used as an input of the deep neural network 690. Then, the output of the deep neural network 690 is transformed by the inverse short-time Fourier transform (ISTFT), and the resulting signal is used as an output audio signal of the denoise/dereverberator/mic simulator 680.

This output audio signal does not include picked-up sound noise or room reverberation, and includes the target microphone characteristics. Therefore, as an output audio signal of the denoise/dereverberator/mic simulator 680, a smartphone-recorded signal is obtained in which the picked-up sound noise and the room reverberation are removed and the target microphone characteristics are obtained.

As described above, the denoise/dereverberator/mic simulator 680 illustrated in FIG. 22 can satisfactorily remove the picked-up sound noise and room reverberation included in the smartphone-recorded signal and also include the target microphone characteristics into the smartphone-recorded signal satisfactorily. In this case, the deep neural network 690 is used to perform all the processing for the case where the studio simulation is not performed, and the amount of processing in the cloud can be reduced.

Figure 23:
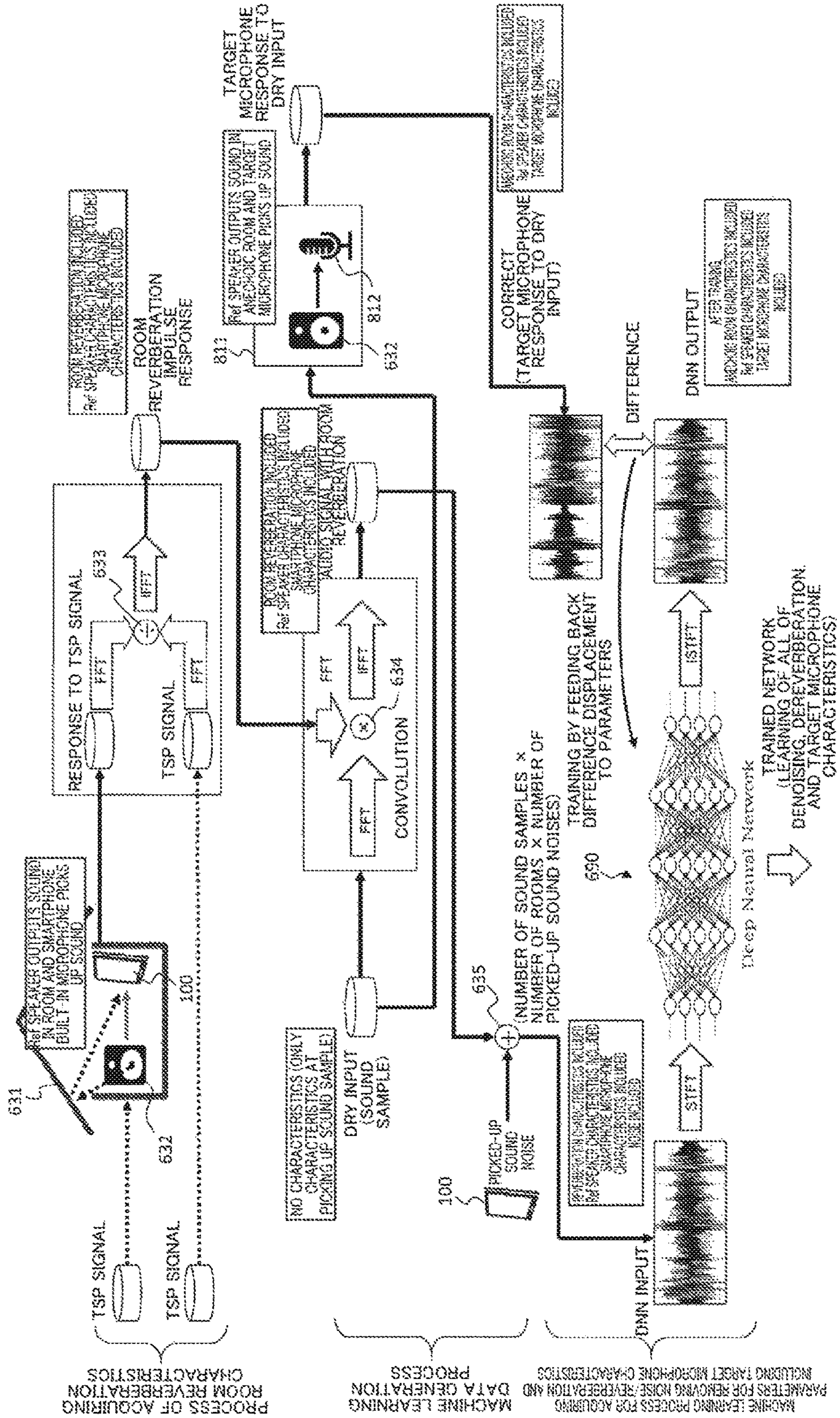
FIG. 23 is a diagram illustrating an example of processing of training a deep neural network that constitutes the denoise/dereverberator/mic simulator.

FIG. 23 illustrates an example of processing of training the deep neural network 690 that constitutes the denoise/dereverberator/mic simulator 680 of FIG. 22. The process of training includes a process of acquiring room reverberation, a machine learning data generation process, and a machine learning process of acquiring parameters to remove noise and reverberation and include the target microphone characteristics.

First, the process of acquiring room reverberation will be described. A reference speaker 632 outputs sound based on a time stretched pulse (TSP) signal in a room 631, and the built-in microphone 101 of the smartphone 100 picks up the sound, so that a response to the TSP signal can be obtained. A divider 633 divides a fast Fourier transform (FFT) output of the response to the TSP signal by a fast Fourier transform (FFT) output of the TSP signal, and transforms the resulting value by the inverse fast Fourier transform (IFFT) to acquire a room reverberation impulse response.

This room reverberation impulse response includes room reverberation, includes the characteristics of the reference speaker 632, and includes the characteristics of the built-in microphone 101 of the smartphone 100. By using the TSP signal itself instead of the response to the TSP signal as the denominator of the complex division, a stable and accurate finite impulse response (FIR) solution can be obtained as the room reverberation impulse response.

Next, the machine learning data generation process will be described. A multiplier 634 multiplies a fast Fourier transform (FFT) output of a sound sample serving as a dry input that includes only the characteristics at the time of picking up the sound sample by a fast Fourier transform (FFT) output of the room reverberation impulse response, and transforms the resulting value by the inverse fast Fourier transform (IFFT), that is, convolves the sound sample serving as the dry input with the room reverberation impulse response, to generate an audio signal with room reverberation. This audio signal with room reverberation includes the room reverberation of the room 631, includes the characteristics of the reference speaker 632, and includes the characteristics of the built-in microphone 101 of the smartphone 100.

Then, an adder 635 adds the picked up sound noise picked up by the built-in microphone 101 of the smartphone 100 to the audio signal with room reverberation, to generate an input for training the deep neural network 690. This input includes the room reverberation of the room 631, includes the characteristics of the reference speaker 632, includes the characteristics of the built-in microphone 101 of the smartphone 100, and even includes the picked-up sound noise. In this case, it is possible to obtain learning data corresponding to "the number of sound samples×the number of rooms×the number of picked-up sound noises".

A reference speaker 632 outputs sound with a sound sample serving as a dry input in an anechoic room 811 and a target microphone 812 picks up the sound, so that a target microphone response to the sound sample serving as the dry input given as the correct answer for training the deep neural network 690 is obtained. This target microphone response includes the characteristics of the anechoic room, includes the characteristics of the reference speaker 632, and includes the characteristics of the target microphone 812.

Next, the machine learning process will be described. The audio signal with room reverberation including the picked up sound noise obtained by the adder 635 is transformed by the short-time Fourier transform (STFT) and input to the deep neural network 690. Then, a difference is calculated between an audio signal (DNN output) obtained by transforming the output of the deep neural network 690 by the inverse short-time Fourier transform (ISTFT) and the target microphone response to the sound sample serving as the dry input given as the correct answer, and the deep neural network 690 is trained by feeding back the difference displacement to parameters. The audio signal (DNN output) after training does not include picked-up sound noise or room reverberation, but includes the characteristics of the anechoic room, includes the characteristics of the reference speaker 632, and even includes the (linear and non-linear) characteristics of the target microphone 812.

Figure 24:
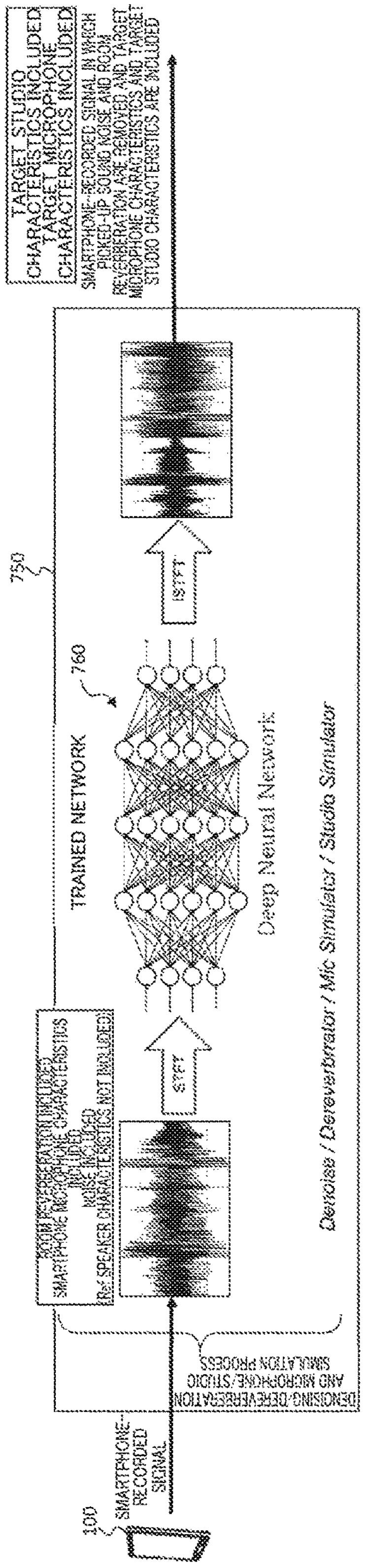
FIG. 24 is a diagram illustrating a configuration example of a denoise/dereverberator/mic simulator/studio simulator having the functions of the denoise, the dereverberator, the mic simulator, and the studio simulator.

FIG. 24 illustrates a configuration example of a denoise/dereverberator/mic simulator/studio simulator 750 having the functions of the denoise 600, the dereverberator 700, the mic simulator 800, and the studio simulator 900.

The denoise/dereverberator/mic simulator/studio simulator 750 removes picked-up sound noise and room reverberation from the input audio signal (recorded sound source), and further performs processing of including the target microphone characteristics and the target studio characteristics into it. This input audio signal includes room reverberation corresponding to the room in which sound is picked up, includes the characteristics of the built-in microphone 101 of the smartphone 100, and includes picked-up sound noise that is noise that is mixed during sound pickup.

The denoise/dereverberator/mic simulator/studio simulator 750 uses a deep neural network (DNN) 760 trained to remove picked-up sound noise and room reverberation and further include the target microphone characteristics and the target studio characteristics to remove picked-up sound noise and room reverberation from the input audio signal and include the target microphone characteristics and the target studio characteristics into this input audio signal.

In this case, the input audio signal is transformed by the short-time Fourier transform (STFT), and the resulting signal is used as an input of the deep neural network 760. Then, the output of the deep neural network 760 is transformed by the inverse short-time Fourier transform (ISTFT), and the resulting signal is used as an output audio signal of the denoise/dereverberator/mic simulator/studio simulator 750.

This output audio signal does not include picked-up sound noise or room reverberation, and includes the target microphone characteristics and the target studio characteristics. Therefore, as an output audio signal of the denoise/dereverberator/mic simulator/studio simulator 750, a smartphone-recorded signal is obtained in which the picked-up sound noise and the room reverberation are removed and the target microphone characteristics and the target studio characteristics are obtained.

As described above, the denoise/dereverberator/mic simulator/studio simulator 750 illustrated in FIG. 24 can satisfactorily remove the picked up sound noise and room reverberation included in the smartphone-recorded signal and also include the target microphone characteristics and the target studio characteristics into the smartphone-recorded signal satisfactorily. In this case, the deep neural network 760 is used to perform all the processing, and the amount of processing in the cloud can be reduced.

Figure 25:
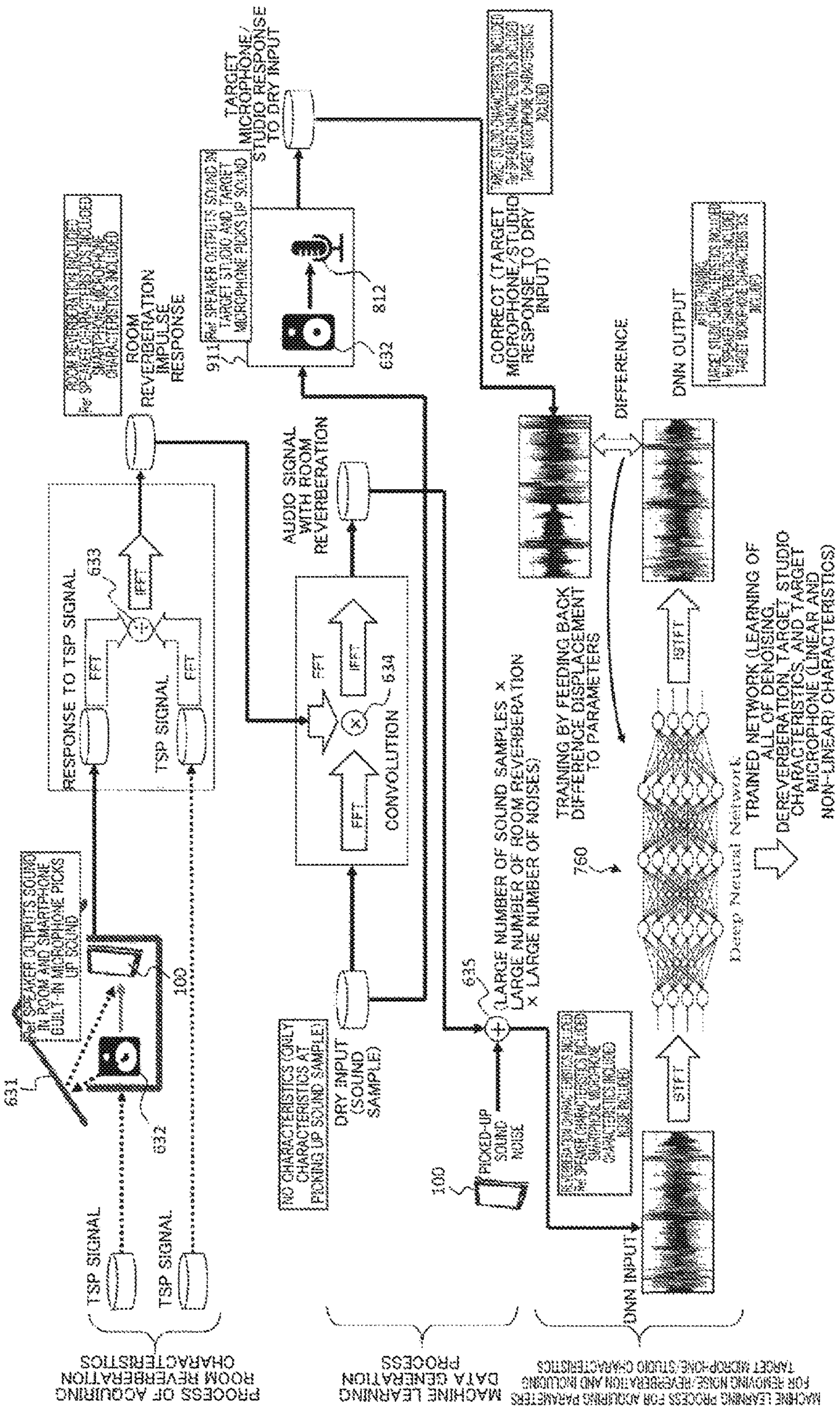
FIG. 25 is a diagram illustrating an example of processing of training a deep neural network that constitutes the denoise/dereverberator/mic simulator/studio simulator.

FIG. 25 illustrates an example of processing of training the deep neural network 760 that constitutes the denoise/dereverberator/mic simulator/studio simulator 750 of FIG. 24. The process of training includes a process of acquiring room reverberation, a machine learning data generation process, and a machine learning process of acquiring parameters to remove noise and reverberation and include the target microphone/studio characteristics.

The process of acquiring room reverberation is the same as that described with reference to FIG. 23, and thus the description thereof will be omitted. In the machine learning data generation process, the process of generating an input (DNN input) for learning the deep neural network 760 is the same as that described with reference to FIG. 23, and thus the description thereof will be omitted.

In the machine learning data generation process, the correct answer given for training the deep neural network 760 is used as a target microphone/studio response to the sound sample serving as a dry input. In this case, a reference speaker 632 outputs sound with a sound sample serving as a dry input in a target studio 911, and a target microphone 812 picks up the sound, so that a target microphone/studio response is generated. This target microphone/studio response includes the characteristics of the target studio 911, includes the characteristics of the reference speaker 632, and includes the characteristics of the target microphone 812.

The machine learning process will be described. The audio signal with room reverberation including the picked-up sound noise obtained by the adder 635 is transformed by the short-time Fourier transform (STFT) and input to the deep neural network 760. Then, a difference is calculated between an audio signal (DNN output) obtained by transforming the output of the deep neural network 760 by the inverse short-time Fourier transform (ISTFT) and the target microphone/studio response to the sound sample serving as the dry input given as the correct answer, and the deep neural network 760 is trained by feeding back the difference displacement to parameters. The audio signal (DNN output) after training does not include picked-up sound noise or room reverberation, but includes the characteristics of the target studio 911, includes the characteristics of the reference speaker 632, and even includes the (linear and non-linear) characteristics of the target microphone 812.

Figure 26:
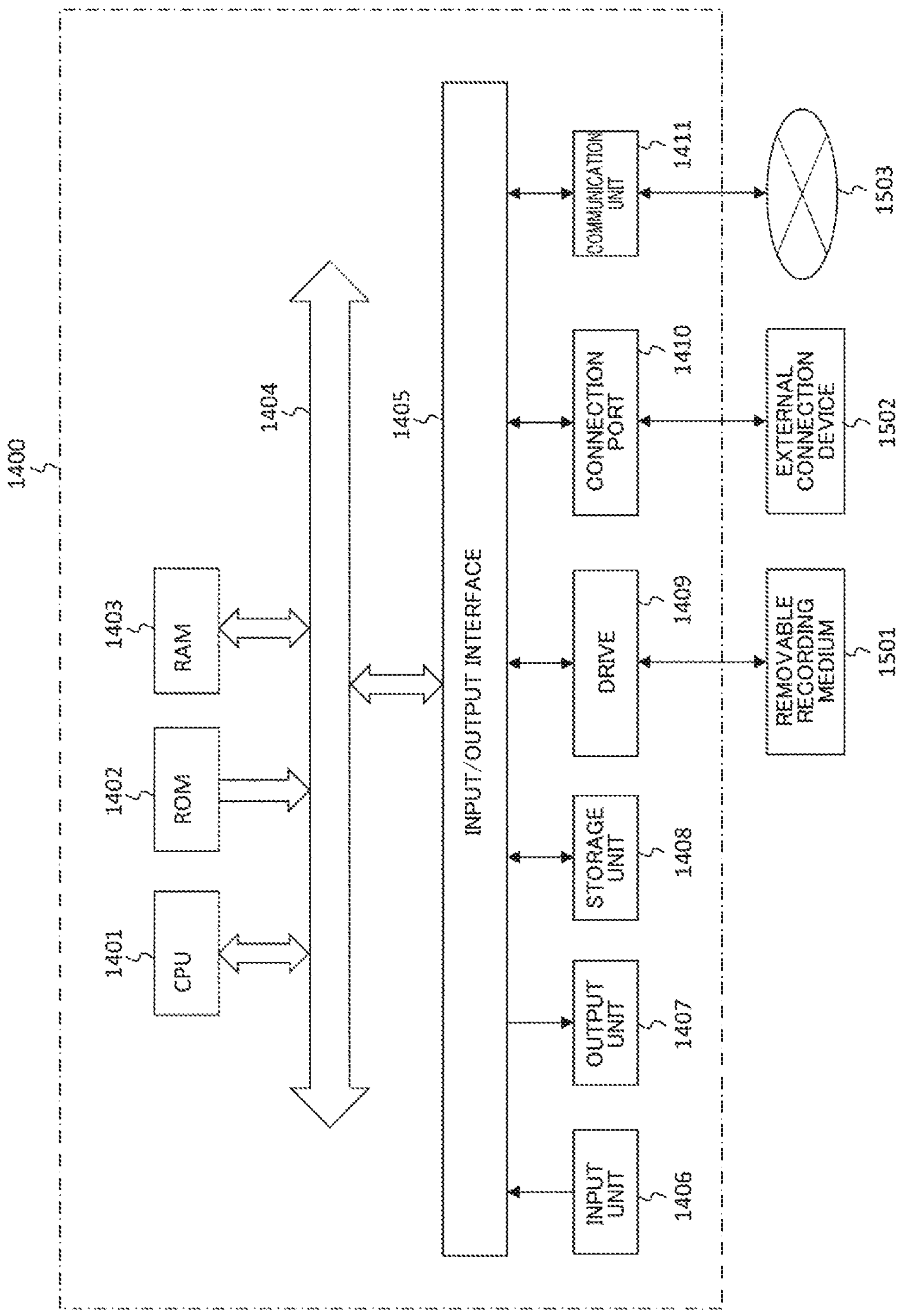
FIG. 26 is a block diagram illustrating a hardware configuration example of a computer (server) in a cloud that constitutes the signal processing device.

FIG. 26 is a block diagram illustrating a hardware configuration example of a computer (server) 1400 in a cloud that constitutes the signal processing device 200 (see FIGS. 1 and 5). The computer 1400 includes a CPU 1401, a ROM 1402, a RAM 1403, a bus 1404, an input/output interface 1405, an input unit 1406, an output unit 1407, a storage unit 1408, a drive 1409, a connection port 1410, and a communication unit 1411. The hardware configuration illustrated herein is an example, and some of the components may be omitted. Components other than the components illustrated herein may be further included.

The CPU 1401 functions as, for example, an arithmetic processing device or a control device, and controls all or some of the operations of the components in accordance with various programs recorded in the ROM 1402, the RAM 1403, the storage unit 1408, or a removable recording medium 1501.

The ROM 1402 is a means for storing a program read into the CPU 1401, data used for computation, and the like. In the RAM 1403, for example, a program read into the CPU 1401, various parameters that change as appropriate when the program is executed, and the like are temporarily or permanently stored.

The CPU 1401, ROM 1402, and RAM 1403 are connected to each other via the bus 1404. On the other hand, the bus 1404 is connected to various components via the interface 1405.

For the input unit 1406, for example, a mouse, a keyboard, a touch panel, buttons, switches, levers, and the like are used. As the input unit 1406, a remote controller capable of transmitting a control signal using infrared rays or other radio waves may be used.

The output unit 1407 is, for example, a device capable of notifying users of acquired information visually or audibly, such as a display device such as a Cathode Ray Tube (CRT), an LCD, or an organic EL, an audio output device such as a speaker or a headphone, a printer, a mobile phone, a facsimile, or the like.

The storage unit 1408 is a device for storing various types of data. As the storage unit 1408, for example, a magnetic storage device such as a hard disk drive (HDD), a semiconductor storage device, an optical storage device, a magneto-optical storage device, or the like is used.

The drive 1409 is a device for reading information recorded on the removable recording medium 1501 such as a magnetic disk, an optical disk, a magneto-optical disk, or a semiconductor memory, or writes information to the removable recording medium 1501.

The removable recording medium 1501 is, for example, a DVD medium, a Blu-ray (registered trademark) medium, an HD DVD medium, various semiconductor storage media, and the like. Naturally, the removable recording medium 1501 may be, for example, an IC card equipped with a non-contact type IC chip, an electronic device, or the like.

The connection port 1410 is a port for connecting an external connection device 1502 such as a Universal Serial Bus (USB) port, an IEEE1394 port, a Small Computer System Interface (SCSI), an RS-232C port, or an optical audio terminal. The external connection device 1502 is, for example, a printer, a portable music player, a digital camera, a digital video camera, an IC recorder, or the like.

The communication unit 1411 is a communication device for connecting to a network 1503, and is, for example, a communication card for wired or wireless LAN, Bluetooth (registered trademark), or Wireless USB (WUSB), a router for optical communication, a router for Asymmetric Digital Subscriber Line (ADSL), or a modem for various communications.

The program executed by a computer may be a program that performs processing chronologically in the order described in the present specification or may be a program that performs processing in parallel or at a necessary timing such as a called time.

2. Modification Example

In the above-described embodiment, an example is given in which the signal processing device 200 in the cloud performs processing of increasing the sound quality of the recorded sound source obtained by picking up the sound with the built-in microphone 101 of the smartphone 100 in any room such as a room at home. However, embodiments are not limited to this example, and the present technology can be applied in the same manner to a case where sound is picked up by any microphone.

Although preferred embodiments of the present disclosure have been described in detail with reference to the accompanying drawings as described above, the technical scope of the present disclosure is not limited to such examples. It is apparent that those having ordinary knowledge in the technical field of the present disclosure could conceive various modified examples or changed examples within the scope of the technical ideas set forth in the claims, and it should be understood that these also naturally fall within the technical scope of the present disclosure.

Further, the effects described in the present specification are merely explanatory or exemplary and are not intended as limiting. That is, the technology according to the present disclosure may exhibit other effects apparent to those skilled in the art from the description herein, in addition to or in place of the above effects.

The present technology can be configured as follows.

(1) A signal processing device including: a sound converter that performs sound conversion processing on an input audio signal obtained by picking up vocal sound or musical instrument sound by using any microphone in any room to obtain an output audio signal, wherein the sound conversion processing includes processing of removing room reverberation from the input audio signal.

(2) The signal processing device according to (1), wherein the processing of removing the room reverberation is performed using a deep neural network trained to remove the room reverberation.

(3) The signal processing device according to (2), wherein the deep neural network has been trained in such a manner that uses as a deep neural network input an audio signal with room reverberation obtained by convolving a dry input with a room reverberation impulse response generated by causing a reference speaker to output sound in a room based on a TSP signal and then picking up the sound with the microphone, and feeds back a difference displacement of a deep neural network output in response to the dry input to parameters.

(4) The signal processing device according to any one of (1) to (3), wherein the sound conversion processing further includes processing of removing picked-up sound noise from the input audio signal.

(5) The signal processing device according to (4), wherein the processing of removing the picked-up sound noise is performed using a deep neural network trained to remove the picked-up sound noise.

(6) The signal processing device according to (5), wherein the deep neural network has been trained in such a manner that uses as a deep neural network input an audio signal obtained by adding noise picked up with the microphone to a dry input, and feeds back a difference displacement of a deep neural network output in response to the dry input to parameters.

(7) The signal processing device according to (5), wherein the deep neural network has been trained in such a manner that uses as a deep neural network input an audio signal obtained by adding picked-up sound noise picked up with the microphone to an audio signal with room reverberation obtained by convolving a dry input with a room reverberation impulse response generated by causing a reference speaker to output sound in a room based on a TSP signal and then picking up the sound with the microphone, and feeds back a difference displacement of a deep neural network output in response to the audio signal with room reverberation to parameters.

(8) The signal processing device according to (4), wherein simultaneously with the processing of removing the room reverberation, the processing of removing the picked-up sound noise is performed using a deep neural network trained to remove the room reverberation and the picked-up sound noise.

(9) The signal processing device according to (8), wherein the deep neural network has been trained in such a manner that uses as a deep neural network input an audio signal obtained by adding picked-up sound noise picked up with the microphone to an audio signal with room reverberation obtained by convolving a dry input with a room reverberation impulse response generated by causing a reference speaker to output sound in a room based on a TSP signal and then picking up the sound with the microphone, and feeds back a difference displacement of a deep neural network output in response to the dry input to parameters.

(10) The signal processing device according to any one of (1) to (9), wherein the sound conversion processing further includes processing of including characteristics of a target microphone into the input audio signal.

(11) The signal processing device according to (10), wherein the processing of including the characteristics of the target microphone is performed by convolving the input audio signal with an impulse response for the characteristics of the target microphone.

(12) The signal processing device according to (11), wherein the impulse response for the characteristics of the target microphone is generated by causing a reference speaker to output sound based on a TSP signal and then picking up the sound with the target microphone.

(13) The signal processing device according to (10), wherein the processing of including the characteristics of the target microphone is performed by convolving the input audio signal with an impulse response for the characteristics of the target microphone and then using a deep neural network trained to include non-linear characteristics of the target microphone.

(14) The signal processing device according to (13), wherein the impulse response for the characteristics of the target microphone is generated by causing a reference speaker to output sound based on a TSP signal and then picking up the sound with the target microphone, and the deep neural network has been trained in such a manner that uses as a deep neural network input an audio signal obtained by convolving with the impulse response for the characteristics of the target microphone, and feeds back to parameters a difference displacement of a deep neural network output in response to the audio signal obtained by causing the reference speaker to output sound based on the dry input and then picking up the sound with the target microphone.

(15) The signal processing device according to (10), wherein the processing of including the characteristics of the target microphone is performed using a deep neural network trained to include both linear and non-linear characteristics of the target microphone into the input audio signal.

(16) The signal processing device according to (15), wherein the deep neural network has been trained in such a manner that uses a dry input as a deep neural network input, and feeds back to parameters a difference displacement of a deep neural network output in response to the audio signal obtained by causing a reference speaker to output sound based on the dry input and then picking up the sound with the target microphone.

(17) The signal processing device according to any one of (1) to (16), wherein the sound conversion processing further includes processing of including characteristics of a target studio into the input audio signal.

(18) The signal processing device according to (17), wherein the processing of including the characteristics of the target studio is performed by convolving the input audio signal with an impulse response for the characteristics of the target studio.

(19) A signal processing method including: a step of performing sound conversion processing on an input audio signal obtained by picking up vocal sound or musical instrument sound by using any microphone in any room to obtain an output audio signal, wherein the sound conversion processing includes processing of removing room reverberation from the input audio signal.

(20) A program causing a computer to function as:

a sound converter that performs sound conversion processing on an input audio signal obtained by picking up vocal sound or musical instrument sound by using any microphone in any room to obtain an output audio signal, wherein the sound conversion processing includes processing of removing room reverberation from the input audio signal.

REFERENCE SIGNS LIST

10, 10A Recording processing system
100, 100A Smartphone
101 Built-in microphone
102, 112, 116, 122, 128 Storage
103, 129 Transmitter
104, 108, 113, 117, 123 Volume
105 Equalizer processor
106, 110, 114, 124 Adder
107 Audio output terminal
109 Reverb processor
111, 115, 121 Receiver
125 Effect processor
126 Mixer
127 Mastering unit
200 Signal processing device
300 Processing and production device
301 Receiver
302, 305, 307 Storage
303 Effect processor
304 Mixer
306 Mastering unit
400 Vocalist
500 Musician
600 Denoise
610, 660, 690 Deep neural network
621, 635, 665 Adder
631 Room
632 Reference speaker
633, 663 Divider
634, 664 Multiplier
650 Denoise/dereverberator
680 Denoise/dereverberator/mic simulator
700 Dereverberator
710, 760 Deep neural network
713 Divider
714 Multiplier
750 Denoise/dereverberator/mic simulator/studio simulator
800 Mic simulator
810, 814, 860 Multiplier
811 Anechoic room
812 Target microphone
813, 861 Divider
820, 830 Deep neural network
850 Mic simulator/studio simulator
900 Studio simulator
910 Multiplier
911 Target studio
912 Ideal speaker
913 Ideal microphone
914 Divider

The invention claimed is:

1. A signal processing device, comprising:
a sound converter configured to:
perform a first process on an input audio signal to obtain an output signal, wherein
the input audio signal is from a first microphone,
the first microphone picks up one of vocal sound or musical instrument sound in a first room, and
the first process is a process of removal of room reverberation from the input audio signal; and
perform a second process on the output signal to obtain an output audio signal, wherein
the second process is a process of inclusion of characteristics of a target microphone and characteristics of an anechoic room into the output signal.

2. The signal processing device according to claim 1, wherein the first process of removing the room reverberation is performed using a deep neural network trained to remove the room reverberation.

3. The signal processing device according to claim 2, wherein the deep neural network has been trained in such a manner that uses as a deep neural network input an audio signal with the room reverberation obtained by convolving a dry input with a room reverberation impulse response generated by causing a reference speaker to output sound in a room based on a Time stretched Pulse (TSP) signal and then picking up the sound with the first microphone, and feeds back a difference displacement of a deep neural network output in response to the dry input to parameters.

4. The signal processing device according to claim 1, wherein the sound converter is further configured to perform a third process on the input audio signal, and the third process is a process of removal of picked-up sound noise from the input audio signal.

5. The signal processing device according to claim 4, wherein the third process of removing the picked-up sound noise is performed using a deep neural network trained to remove the picked-up sound noise.

6. The signal processing device according to claim 5, wherein the deep neural network has been trained in such a manner that uses as a deep neural network input an audio signal obtained by adding noise picked up with the first microphone to a dry input, and feeds back a difference displacement of a deep neural network output in response to the dry input to parameters.

7. The signal processing device according to claim 5, wherein the deep neural network has been trained in such a manner that uses as a deep neural network input an audio signal obtained by adding the picked-up sound noise picked up with the first microphone to an audio signal with room reverberation obtained by convolving a dry input with a room reverberation impulse response generated by causing a reference speaker to output sound in a room based on a Time stretched Pulse (TSP) signal and then picking up the sound with the first microphone, and feeds back a difference displacement of a deep neural network output in response to the audio signal with the room reverberation to parameters.

8. The signal processing device according to claim 4, wherein simultaneously with the first process of removing the room reverberation, the third process of removing the picked-up sound noise is performed using a deep neural network trained to remove the room reverberation and the picked-up sound noise.

9. The signal processing device according to claim 8, wherein the deep neural network has been trained in such a manner that uses as a deep neural network input an audio signal obtained by adding the picked-up sound noise picked up with the first microphone to an audio signal with the room reverberation obtained by convolving a dry input with a room reverberation impulse response generated by causing a reference speaker to output sound in a room based on a Time stretched Pulse (TSP) signal and then picking up the sound with the first microphone, and feeds back a difference displacement of a deep neural network output in response to the dry input to parameters.

10. The signal processing device according to claim 1, wherein the sound converter is further configured to perform the second process based on convolution of the output signal with an impulse response, and the impulse response includes the characteristics of the target microphone and the characteristics of the anechoic room.

11. The signal processing device according to claim 10, wherein the sound converter is further configured to:

control a reference speaker to output first sound, wherein the output of the first sound is based on a time stretched pulse (TSP) signal, and the target microphone picks up the outputted first sound; and generate the impulse response based on the outputted first sound.

12. The signal processing device according to claim 1, wherein the second process of including the characteristics of the target microphone is performed by convolving the input audio signal with an impulse response for the characteristics of the target microphone and then using a deep neural network trained to include non-linear characteristics of the target microphone.

13. The signal processing device according to claim 12, wherein the impulse response for the characteristics of the target microphone is generated by causing a reference speaker to output first sound based on a TSP signal and then picking up the outputted first sound with the target microphone, and the deep neural network has been trained in such a manner that uses as a deep neural network input an audio signal obtained by convolving with the impulse response for the characteristics of the target microphone, and feeds back to parameters a difference displacement of a deep neural network output in response to the audio signal obtained by causing the reference speaker to output second sound based on a dry input and then picking up the outputted second sound with the target microphone.

14. The signal processing device according to claim 1, wherein the second process of including the characteristics of the target microphone is performed using a deep neural network trained to include both linear and non-linear characteristics of the target microphone into the input audio signal.

15. The signal processing device according to claim 14, wherein the deep neural network has been trained in such a manner that uses a dry input as a deep neural network input, and feeds back to parameters a difference displacement of a deep neural network output in response to an audio signal obtained by causing a reference speaker to output sound based on the dry input and then picking up the outputted sound with the target microphone.

16. The signal processing device according to claim 1, wherein the sound converter is further configured to perform a fourth process, and the fourth process is a process of inclusion of characteristics of a target studio into the input audio signal.

17. The signal processing device according to claim 16, wherein the sound converter is further configured to perform the fourth process based on convolution of the input audio signal with an impulse response, and the impulse response includes the characteristics of the target studio.

18. A signal processing method, comprising:

a first process on an input audio signal to obtain an output signal, wherein the input audio signal is from a first microphone, the first microphone picks up one of vocal sound or musical instrument sound in a first room, and the first process is a process of removal of room reverberation from the input audio signal; and performing a second process on the output signal to obtain an output audio signal, wherein the second process is a process of inclusion of characteristics of a target microphone and characteristics of an anechoic room into the output signal.

19. A non-transitory computer-readable medium having stored thereon, computer-executable instructions which, when executed by a computer, cause the computer to execute operations, the operations comprising:

performing a first process on an input audio signal to obtain an output signal, wherein the input audio signal is from a first microphone, the first microphone picks up one of vocal sound or musical instrument sound in a first room, and the first process is a process of removal of room reverberation from the input audio signal; and perform a second process on the output signal to obtain an output audio signal, wherein the second process is a process of inclusion of characteristics of a target microphone and characteristics of an anechoic room into the output signal.

* * * * *